(12) United States Patent
Anderson et al.

(10) Patent No.: US 6,364,170 B1
(45) Date of Patent: Apr. 2, 2002

(54) FLUID DISPENSER APPARATUS

(75) Inventors: Mark L. Anderson, 303 S. MacKay Ave., Spring Valley, WI (US) 54767; John C. Harmon, Eau Galle, WI (US); James E. Wait, Colfax, WI (US); Wayne Wellstein, Menomonie, WI (US)

(73) Assignee: Mark L. Anderson, Spring Valley, WI (US)

( * ) Notice: Subject to any disclaimer, the term of this patent is extended or adjusted under 35 U.S.C. 154(b) by 0 days.

(21) Appl. No.: 09/430,711

(22) Filed: Oct. 29, 1999

Related U.S. Application Data

(63) Continuation-in-part of application No. 09/304,297, filed on May 3, 1999, now Pat. No. 6,253,961.
(60) Provisional application No. 60/019,249, filed on Jun. 7, 1996.

(51) Int. Cl.⁷ .............................................. B65D 88/54
(52) U.S. Cl. ...................... 222/321.7; 222/43; 222/131; 222/183; 222/309; 222/324; 222/383.3; 604/183
(58) Field of Search .......................... 222/321.6, 321.7, 222/183, 131, 192, 83, 309, 324, 383.3, 43, 389; 604/183

(56) References Cited

U.S. PATENT DOCUMENTS

| | | | |
|---|---|---|---|
| 1,496,126 A | | 6/1924 | Livingstone |
| 2,086,467 A | | 7/1937 | Bryan |
| 2,172,521 A | * | 9/1939 | Shoner .................. 221/102 |
| 2,605,763 A | | 8/1952 | Smoot |
| 2,736,315 A | | 2/1956 | Feeney |
| 2,753,079 A | | 7/1956 | Hersey |
| 2,825,334 A | | 3/1958 | Kas, Sr. |
| 3,016,897 A | * | 1/1962 | Kendrick .................. 128/218 |

(List continued on next page.)

FOREIGN PATENT DOCUMENTS

| GB | 1 412 312 | 11/1975 |
|---|---|---|
| GB | 2 196 534 | 5/1988 |

OTHER PUBLICATIONS

Genesis Induatries, Inc., Mini–Cartridge Automatic Syringe System, Web Page, Sep., 1999.

Mark A. Haubrich, Brochure, Oct. 13, 1999.

Primary Examiner—Kevin Shaver
Assistant Examiner—Melvin A. Cartagena
(74) Attorney, Agent, or Firm—Skinner & Associates

(57) ABSTRACT

A fluid dispenser used to administer fixed or adjustable doses of fluids in oral, intranasal, or injectable applications. The dispenser may be used to draw off fluid from a flexible or rigid bulk container or to draw fluid from a mounted flexible or rigid container such as a sealed-end bag or bottle, or a threaded bag or bottle. The fluid dispenser generally comprises: a connection member communicatively connected to a fluid source container; a body member having a dose cylinder communicatively connected to the connection member; a piston member operationally related to the dose cylinder and spring biased in an extended position; and a trigger member attached to the piston member and communicatively connected to the dose cylinder through the piston member. The dispenser may include a guide positioned on the connection member. The guide includes a platform portion and a guide portion, both of which being adapted to form a container passage. The dispenser may also include a sealed chamber mounted on the connection member. The sealed chamber has a first tip, a second tip, and a movable seal positioned within the sealed chamber. The movable seal forms a first reservoir proximate to and in fluid communication with the first tip and a second reservoir proximate to and in fluid communication with the second tip. Both of the tips are adapted to be selectively connected in fluid communication with the fluid communication channel and with an external fluid source.

13 Claims, 20 Drawing Sheets

U.S. PATENT DOCUMENTS

| | | |
|---|---|---|
| 3,209,951 A | 10/1965 | Greene et al. |
| 3,215,171 A | 11/1965 | Mitchell |
| 3,228,564 A | 1/1966 | Olson |
| 3,526,225 A | 9/1970 | Isobe |
| 3,604,592 A | 9/1971 | Bacon et al. |
| 3,827,601 A * | 8/1974 | Magrath et al. ............... 222/83 |
| 3,831,602 A | 8/1974 | Bradwin |
| 3,952,918 A | 4/1976 | Poitras et al. |
| 3,952,919 A | 4/1976 | Hansen et al. |
| 4,185,755 A | 1/1980 | Sachs et al. |
| 4,564,360 A | 1/1986 | Young et al. |
| D287,211 S | 12/1986 | Weiss |
| 4,678,107 A | 7/1987 | Ennis, III |
| 4,826,050 A | 5/1989 | Murphy et al. |
| 4,852,772 A | 8/1989 | Ennis, III |
| 4,871,092 A | 10/1989 | Maerte |
| 4,923,096 A | 5/1990 | Ennis, III |
| 4,923,448 A | 5/1990 | Ennis, III |
| 4,981,472 A | 1/1991 | Ennis, III et al. |
| 4,995,867 A | 2/1991 | Zollinger |
| 5,176,645 A | 1/1993 | Guerrero |
| 5,188,610 A | 2/1993 | Rains |
| B14,981,472 A | 2/1993 | Ennis, III et al. |
| 5,190,191 A | 3/1993 | Reyman |
| 5,217,442 A | 6/1993 | Davis |
| 5,344,409 A | 9/1994 | Ennis, III et al. |
| 5,413,255 A | 5/1995 | Dent |
| 5,435,462 A | 7/1995 | Fujii |
| 5,482,095 A | 1/1996 | De Chollet |
| 5,553,750 A | 9/1996 | Foster |
| B24,981,472 A | 12/1996 | Ennis, III, et al. |
| 5,600,958 A | 2/1997 | Henning et al. |
| 5,695,090 A | 12/1997 | Burdick |
| 5,988,452 A | 6/1998 | Dent et al. |
| 5,816,453 A * | 10/1998 | Spencer et al. .......... 222/321.3 |
| 5,887,764 A | 3/1999 | Ennis, III et al. |
| 5,931,347 A * | 8/1999 | Haubrich .................... 222/129 |
| 6,138,848 A * | 10/2000 | Fermo ....................... 215/11.1 |

* cited by examiner

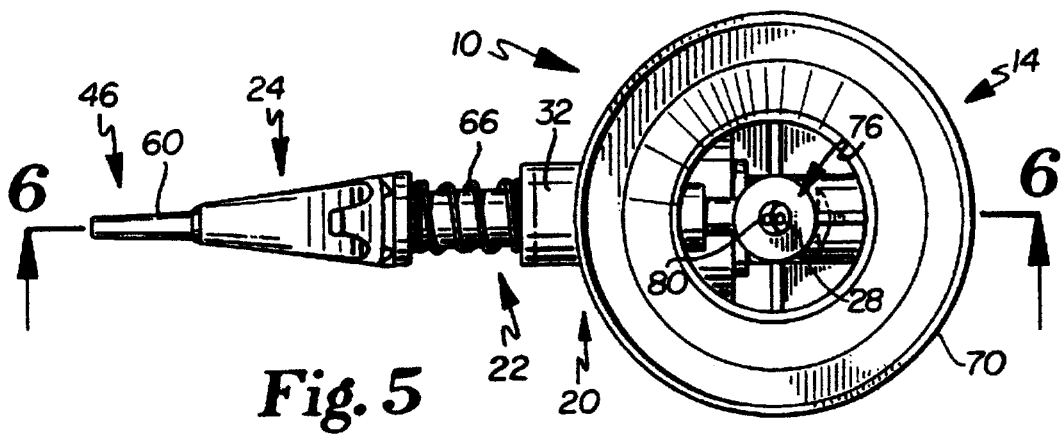
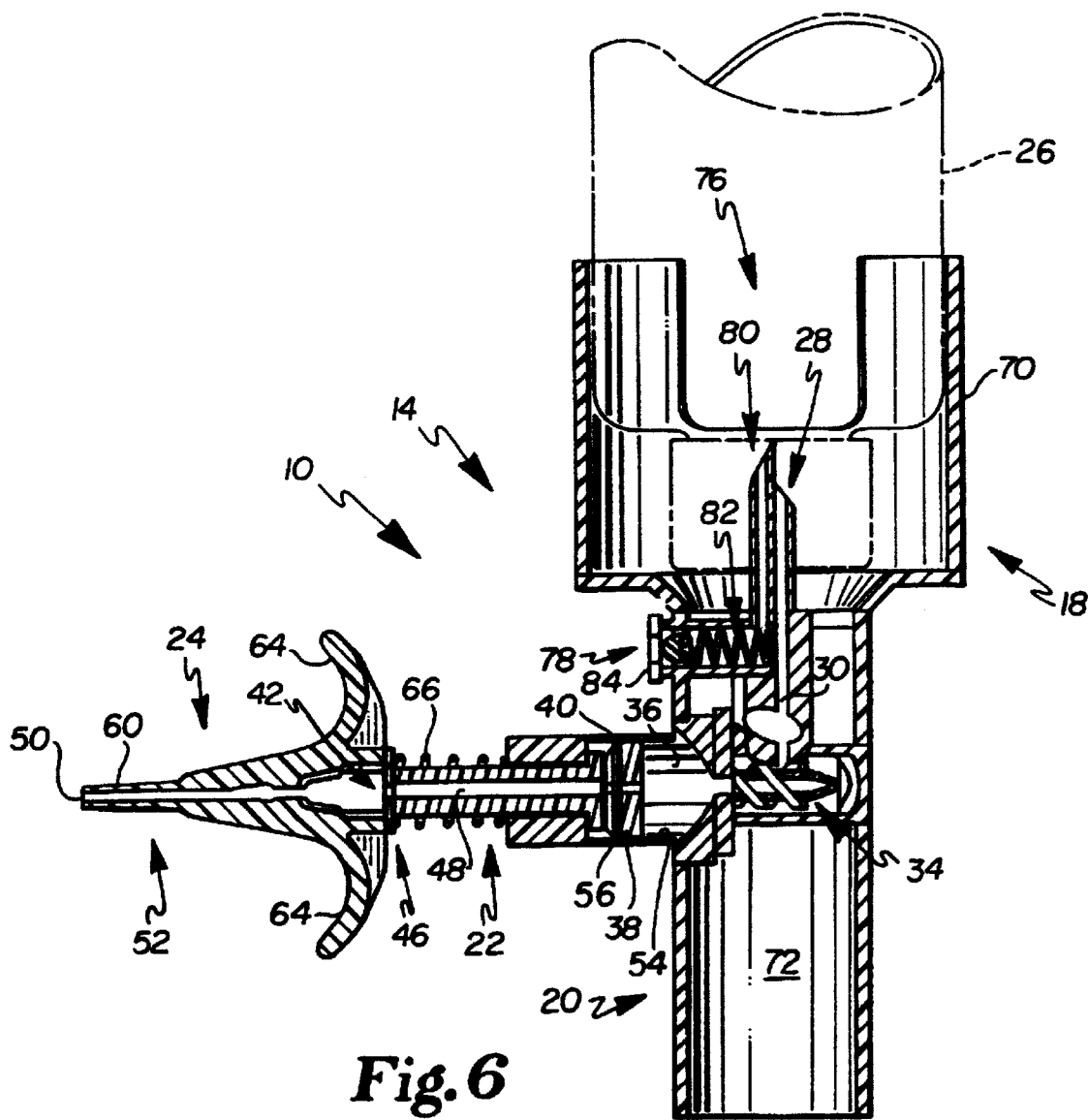

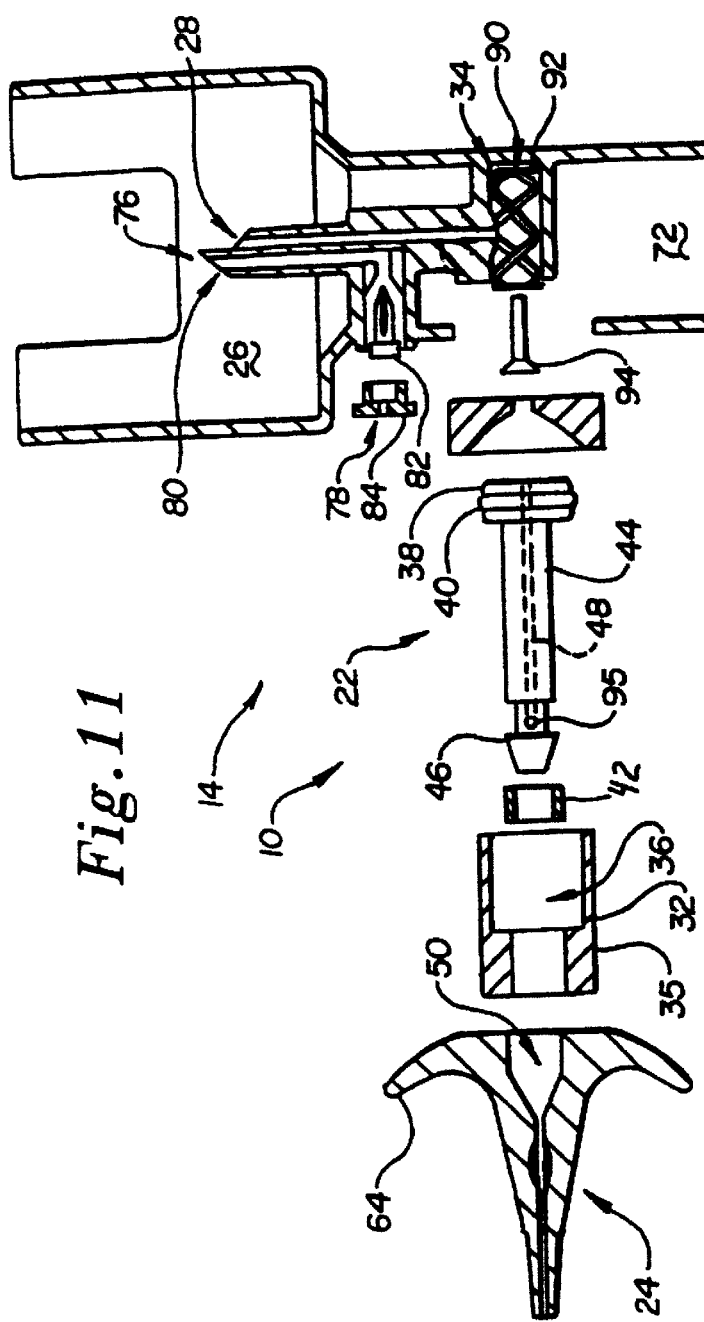
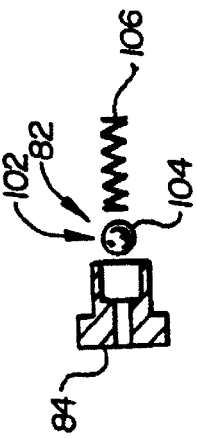
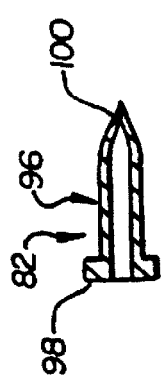

FLUID DISPENSER APPARATUS

CROSS-REFERENCE TO RELATED APPLICATIONS, IF ANY

This application is a continuation-in-part of application Ser. No. 09/304,297, filed May 3, 1999, U.S. Pat. No. 6,253,961, which claims the benefit of application Ser. No. 08/870,918, filed Jun. 6, 1997, U.S. Pat. No. 5,934,510, which claims the benefit of provisional application Serial No. 60/019,249, filed Jun. 7, 1997.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to apparatus and methods for delivering fluids. More particularly, the invention relates to dispensers used to administer medicine. It has an optimal use in delivering multiple doses of various fluids in oral, intranasal, or injectable applications. However, the invention also may have utility in other applications.

2. Background Information

The state of the art includes various devices and methods for dispensing fluids from containers, including pump bottles, spray cans and spray guns. Fluids such as drugs, nutritional supplements and the like have been dispensed to livestock using pop bottles or similar containers, syringes and gas powered gun-type devices for delivering liquid from bulk containers, and have been dispensed to humans using syringes, spoons, cups, and intravenous dosing.

The gun-type devices provide methods for drawing and delivering liquid for oral, hypodermic and topical applications using compressed gas. Therefore they need to be attached to compressed air lines or carry their own pressurized propellant. Although these gun-type devices can deliver adjustable and repeatable doses automatically, they are they are relatively complex and expensive. Furthermore, their mobility is hampered because they require a pressurized gas source. These gun-type devices are generally shown in the following art: Guerrero (U.S. Pat. No. 5,176,645) which describes a pneumatic modular device for dispensing medicine to animals; Murphy et al. (U.S. Pat. No. 4,826,050) which describes a spraying and dosing apparatus used to dispense liquid herbicides and insecticides; and Dent (U.S. Pat. No. 5,413,255) which describes improvements in gas powered applicators for dispensing measured doses of a liquid.

The syringe type devices provide a generally simpler method of dispensing doses. However, they generally require the user to repeatably and manually draw and then dispense the desired doses. Syringe type devices are generally shown in the following art: Ennis, III (U.S. Pat. No. 4,923,096) which describes a dripless automatic syringe for dispensing fluids; Ennis, III (U.S. Pat. No. 5,344,409) which describes a syringe latch; Ennis, III (U.S. Pat. No. 4,852,772) which describes a dispenser for viscous fluids; Ennis, III (U.S. Pat. No. 4,678,107) which describes a dripless dispenser for liquids and viscous fluids; and Ennis, III (U.S. Pat. No. 4,981,472) which describes a cannula assembly for a syringe.

Known devices and methods are believed to have certain limitations in certain cases, including the inability to dispense accurate doses, to accurately place or inject the doses, to function automatically and quickly, to be efficiently and easily used, maintained and cleaned, to function with various container types, and to be disposable.

Applicant's invention provides a dispenser which overcomes the limitations of the known art. It has an ergonomic design, automatic features, and an ability to accurately dispense accurate doses drawn from a variety of fluid sources or containers. The dispenser can be easily lubricated, cleaned and disinfected. However, the dispenser is also relatively inexpensive, thus making it semi-disposable as warranted by the circumstances.

BRIEF SUMMARY OF THE INVENTION

The present invention provides a fluid dispenser which generally comprises: (1) a connection member having a fluid ingress channel; (2) a body member having a fluid communication channel, a dose cylinder of a predetermined volume, and a dose valve; (3) a piston member having a piston head positioned in the dose cylinder, a distal end, a piston rod connecting the distal end to the piston head, a piston valve, and a fluid egress channel; and (4) a trigger member fixedly connected to the distal end of the piston member.

In operation, an unprimed dispenser contains air in the fluid ingress channel, the fluid communication channel, the dose cylinder, the fluid egress channel and the trigger member. Squeezing the trigger member compresses the piston member and expels the air from the dose cylinder. Releasing the trigger member allows the piston member to undergo an expansion stroke which draws fluid into the fluid ingress channel, the fluid communication channel, and the dose cylinder. The dispenser becomes primed after about two compression and expansion cycles when the dispenser contains fluid in all of its channels and cylinders. A primed fluid dispenser draws the dose or predetermined volume of fluid into the dose cylinder during the expansion stroke of the piston member. The fluid is drawn through the fluid ingress channel and the communication channel. The dose of fluid is expelled from the dose cylinder through the fluid egress channel, the piston valve, and the trigger member during a compression stroke. The dose volume is determined by the predetermined dimensions of the dose cylinder and the predetermined displacement volume of the piston member. The dose volume may either be fixed or adjustable. Different volumes can be attained by replacing the piston member with another having a different configuration, by placing different sized blocks within the dose cylinder, or by using an adjustable dispensing mechanism.

In a first "Draw Off" embodiment, the dispenser further includes a mechanism for drawing off or suctioning fluid from a flexible or rigid fluid source container. A fluid stem containing the fluid ingress channel forms part of the connection member and is constructed to receive a hose. The hose connects the fluid source container to the fluid ingress channel. In a second "Threaded Bottle Mount" embodiment, the connection member has an inverted bottle cap form including internally threaded side walls. A flexible or rigid fluid source container with a threaded neck can be screwed onto the connection member so that the fluid is in direct contact with the fluid ingress channel. This second embodiment includes an air intake system which equalizes the pressure between the inside and outside of the fluid source by replacing the fluid dispensed out of the container with air, thus providing smoother and easier fluid flow. The air intake system also prevents contaminants from being suctioned back into the dispenser and into the medicinal supply. In a third "Spike" embodiment, the connection member includes a spike for puncturing a vile, bag or other sealed end, flexible or rigid fluid source container when that container is mounted on the spike. The third embodiment also contains an air intake system for equalizing the pressure between the inside and the outside of the fluid source container. The spike contains both the fluid ingress channel and the vent channel of the air intake system. In a fourth "Protective Cap" embodiment, a protective cap fits on the connection member and covers a fluid source container that is attached to the connection member. A sleeve may be inserted around the container to provide padding and insulation for the fluid source container. In a fifth "Adjustable Dispensing Mechanism" embodiment, the dispenser includes an adjustable dispensing mechanism for dispensing measured doses. The dispensing mechanism includes a stop member having an engagement part, and further includes at least one abutment formed on the piston member for contacting the engagement part and limiting the motion of the piston member. In a sixth "Bottle Guide" embodiment, the dispenser includes a guide positioned on the connection member. The guide includes a platform portion and a guide portion, both of which being adapted to form a container passage. In a seventh "Sealed Chamber" embodiment, the dispenser includes a sealed chamber mounted on the connection member. The sealed chamber has a first tip, a second tip, and a movable seal positioned within the sealed chamber. The movable seal forms a first reservoir proximate to and in fluid communication with the first tip and a second reservoir proximate to and in fluid communication with the second tip. Both of the tips are adapted to be selectively connected in fluid communication with the fluid communication channel and with an external fluid source.

The features, benefits and objects of this invention will become clear to those skilled in the art by reference to the following description, claims and drawings.

BRIEF DESCRIPTION OF THE SEVERAL VIEWS OF THE DRAWING

FIG. 5 is a top view of the spike embodiment of FIG. 4.

FIG. 6 is a cross section of the spike embodiment taken along line 6—6 of FIG. 5.

FIG. 11 is a side view, partially exploded and partially in cross-section for clarity, of the spike embodiment of FIG. 5.

FIG. 12 is a side view of the elastomeric valve used as the air valve in FIG. 11.

FIG. 13 is a side view of a check valve that could alternatively be used as the air valve in FIG. 11.

DETAILED DESCRIPTION

Figure 2:
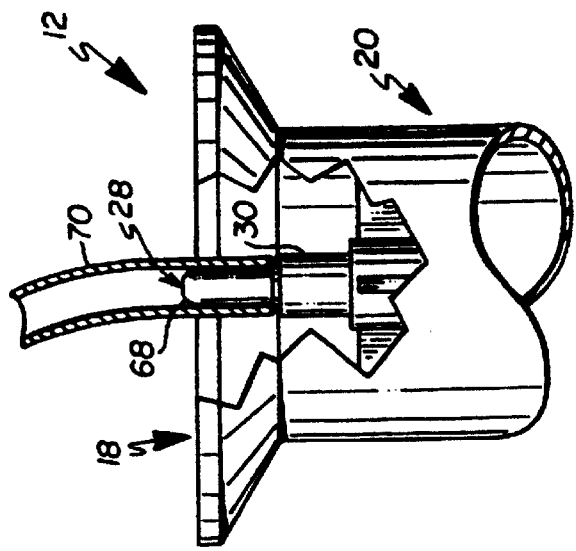
FIG. 2 is a view, partially in cross-section, of a hose attached to the fluid stem of the draw off embodiment of FIG. 1.
Figure 1:
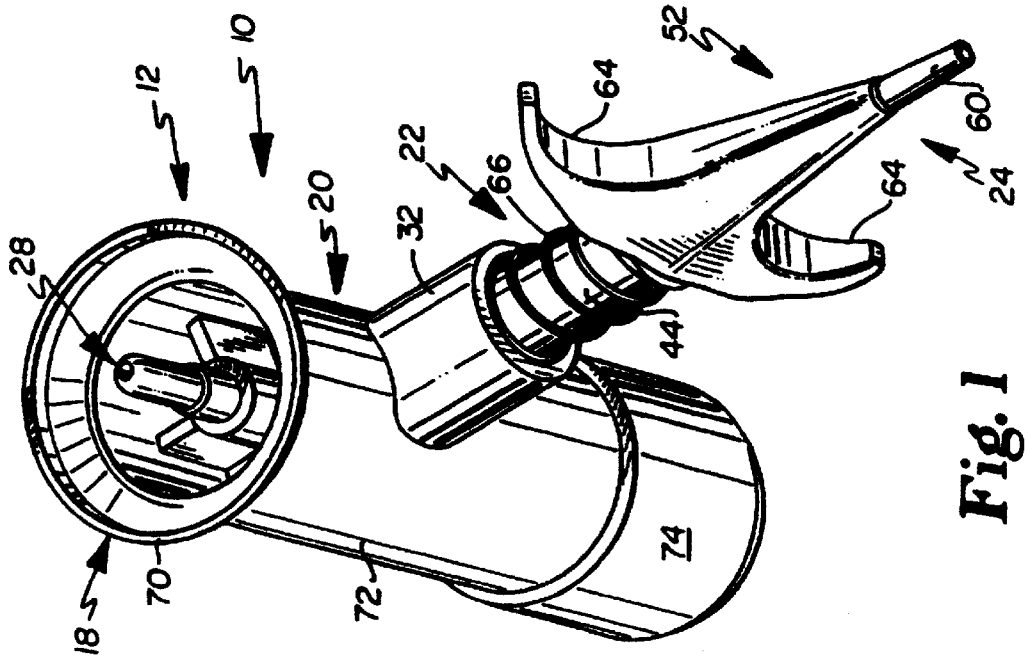
FIG. 1 is a perspective view of a draw off embodiment of the fluid dispenser apparatus of the present invention used to draw off and administer fluid from a bulk container.
Figure 9:
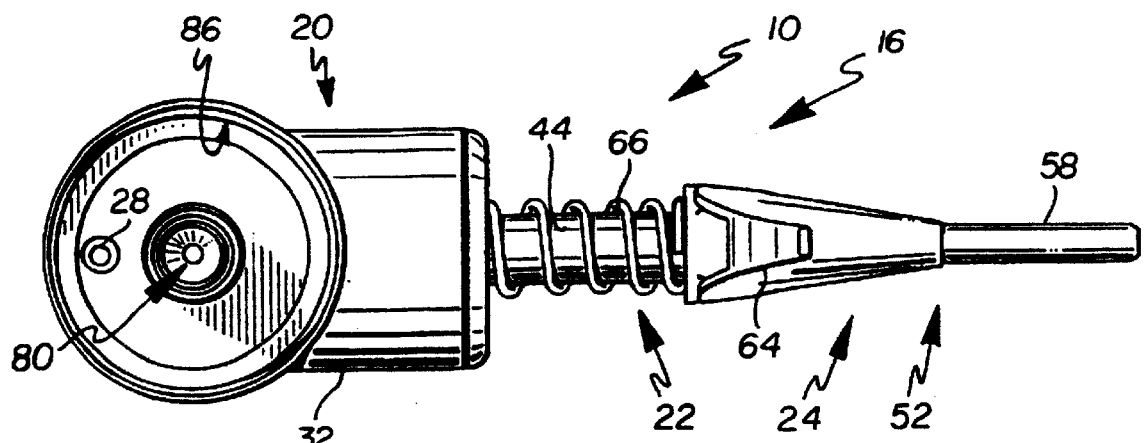
FIG. 9 is a top view of the threaded bottle mount embodiment of FIG. 7.
Figure 15:
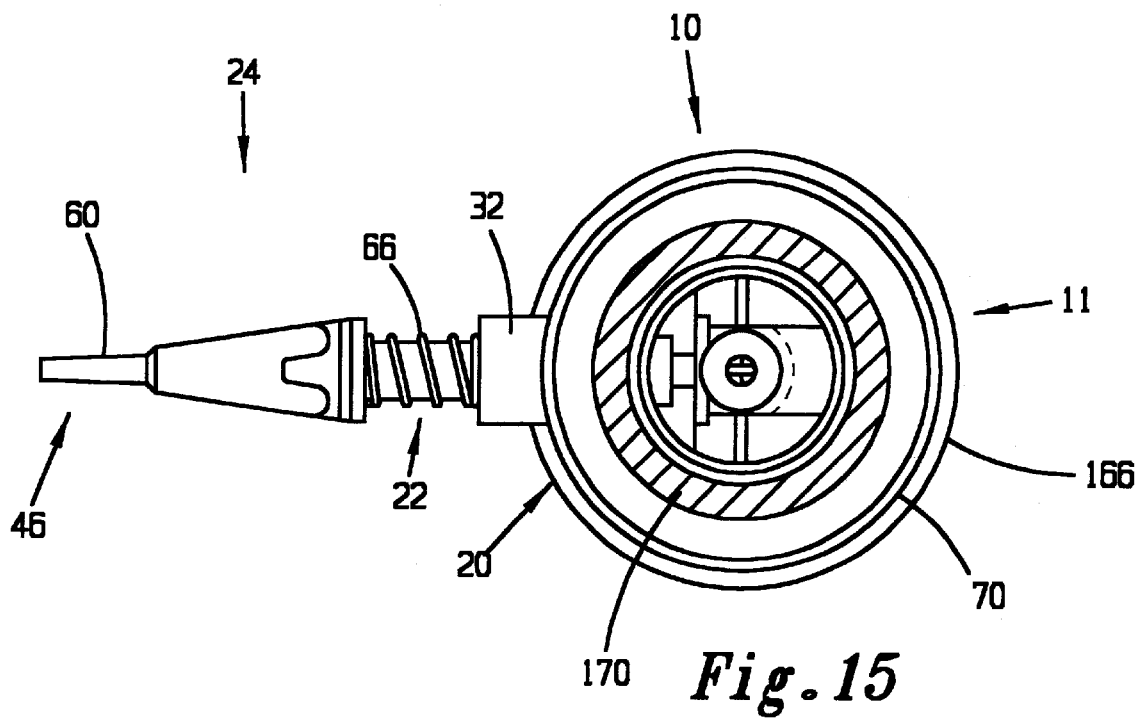
FIG. 15 is a cross-section of the protective cap embodiment taken along line 15—15 of FIG. 14.
Figure 14:
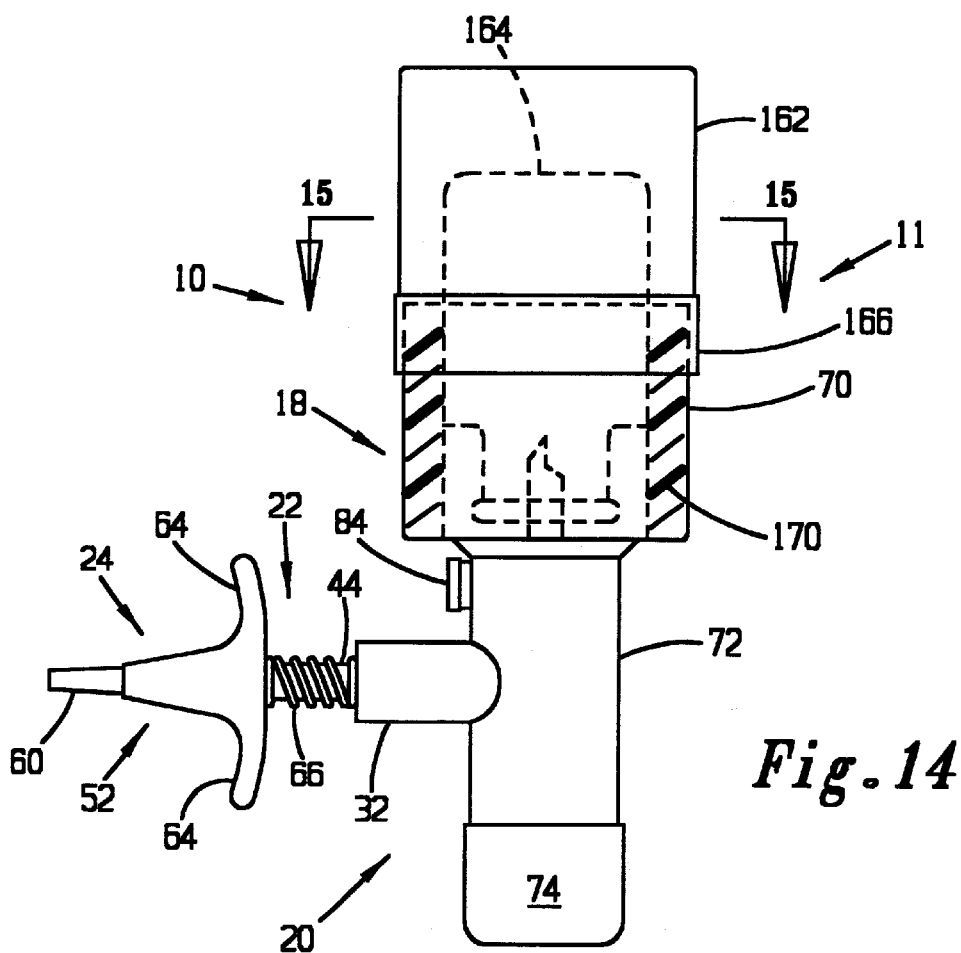
FIG. 14 is a side view of a protective cap embodiment of the fluid dispenser apparatus of the present invention.
Figure 16:
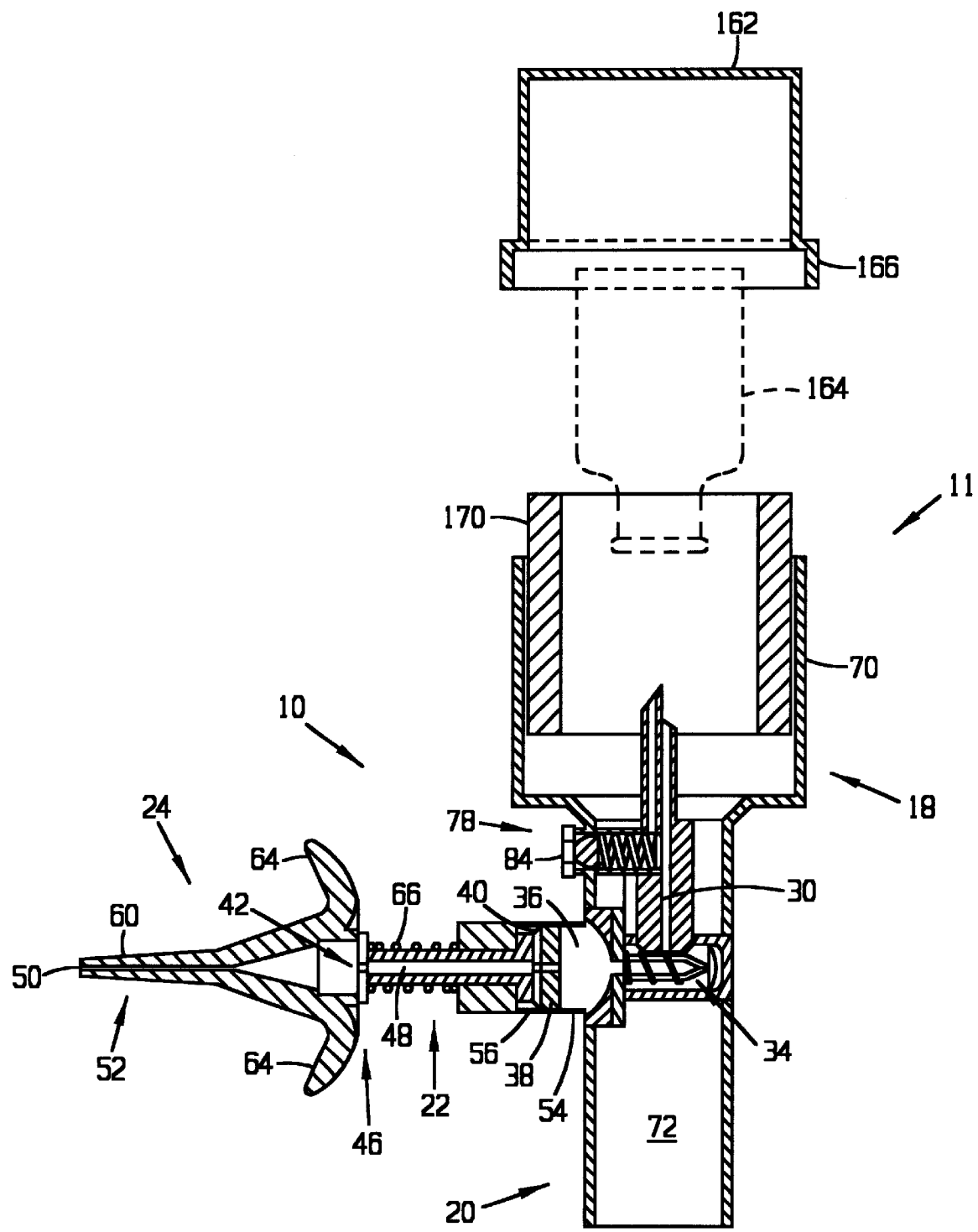
FIG. 16 is an exploded, cross-section view of the protective cap embodiment of FIG. 14.
Figure 18:
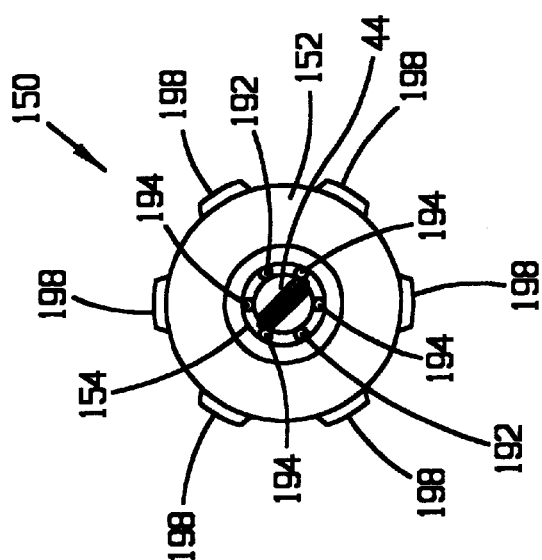
FIG. 18 is a view of the adjustable dose embodiment taken along line 18—18 of FIG. 17.
Figure 17:
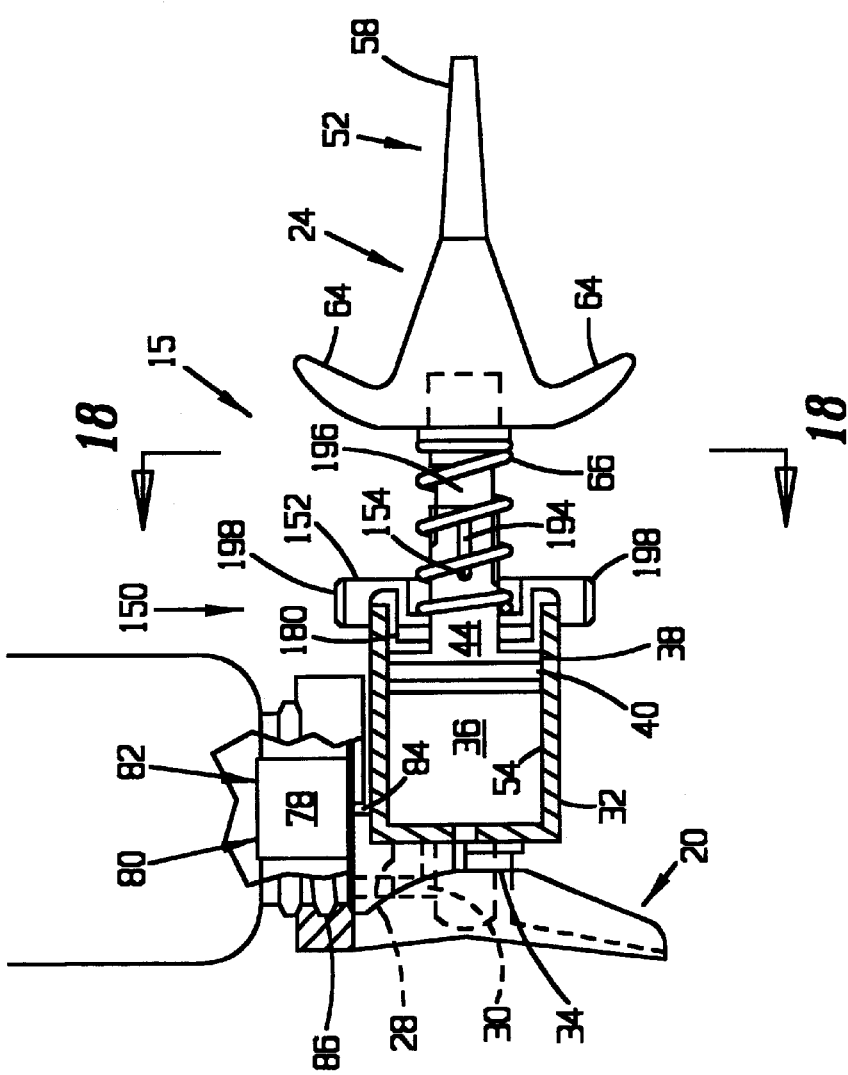
FIG. 17 is a side view, partially in cross-section, of an adjustable dispensing mechanism embodiment of the fluid dispenser of the present invention.
Figure 19:
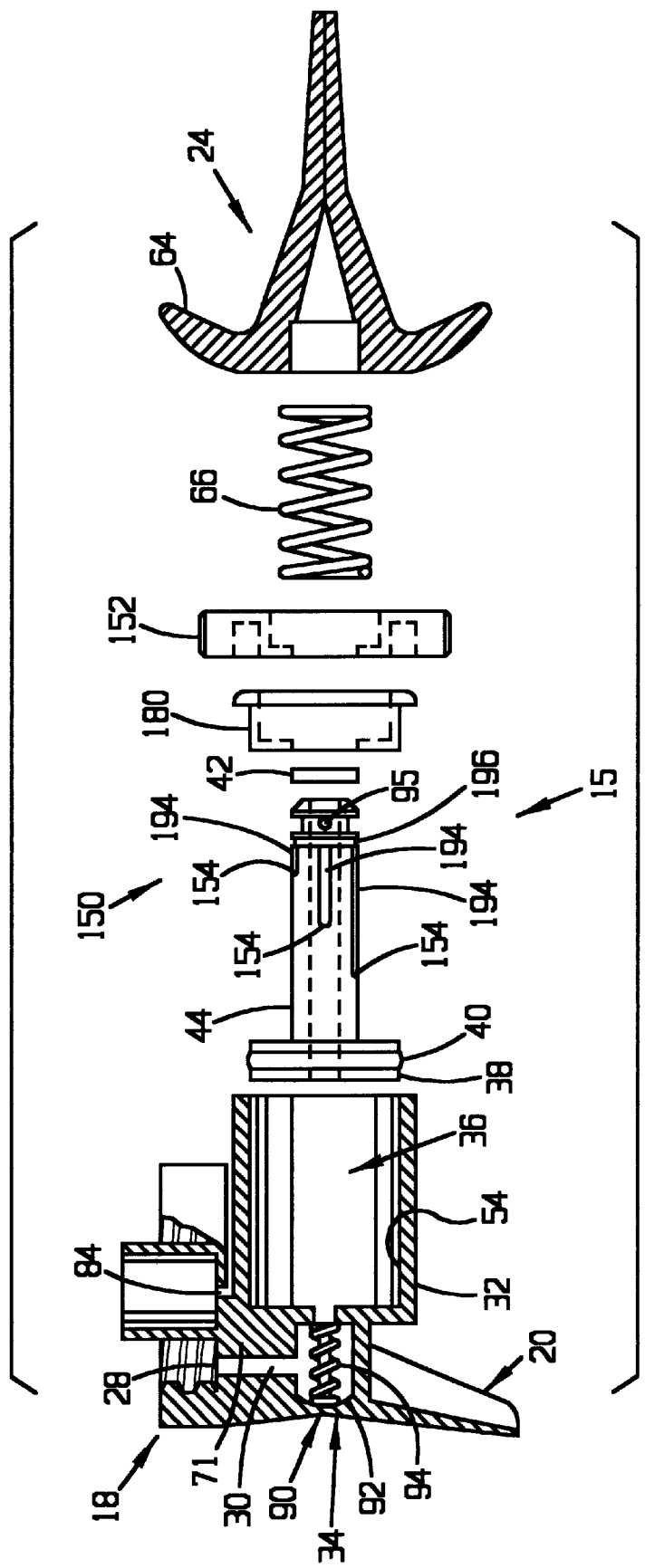
FIG. 19 is an exploded view, partially in cross-section, of the adjustable dose embodiment of FIG. 17.
Figure 25:
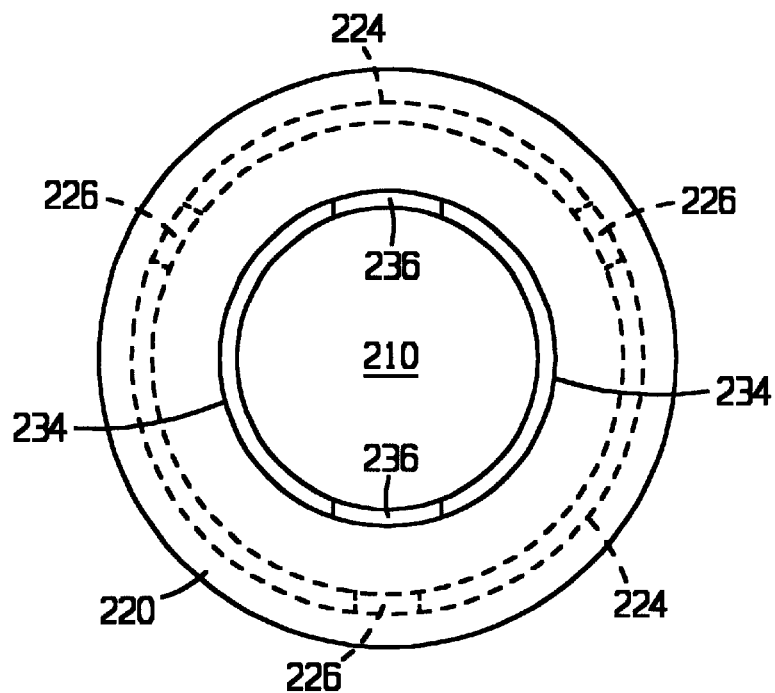
FIG. 25 is a top view of the bottle guide of FIG. 24.

FIGS. 1–32 show examples of five preferred embodiments of the dispenser apparatus 10. FIGS. 1–2 illustrate a "Draw Off" embodiment 12 of the dispenser 10, FIGS. 4–6, and 11 illustrate a "Spike" embodiment 14 of the dispenser 10, FIGS. 7–10 illustrate a "Threaded Bottle Mount" embodiment 16 of the dispenser 10, FIGS. 14–16 illustrate a "Protective Cap" embodiment 11 of the dispenser 10, FIGS. 17–19 illustrate an "Adjustable Dispensing Mechanism" embodiment 15 of the dispenser 10, FIGS. 23–25 illustrate a "Bottle Guide" embodiment 17 of the dispenser 10, and FIGS. 27–32 illustrate a "Sealed Chamber" embodiment 19 of the dispenser 10. The dispenser 10 of all five embodiments is described below first in terms of its major structural elements and then in terms of its secondary structural and/or functional elements which cooperate to economically and ergonomically dispense fixed doses of fluid accurately and rapidly. The differences for each embodiment will be described in detail after the general discussion of the dispenser 10.

As generally shown in FIGS. 1, 4, 7, 10–11, the dispenser 10 includes a connection member 18, a body member 20, a piston member 22, and a trigger member 24. The connection member 18 provides fluid communication between the dispenser 10 and a fluid source or fluid source container 26. The connection member 18 is constructed to have a fluid ingress channel 28 through which the fluid flows from fluid source container 26 and into the body member 20.

Figure 10:
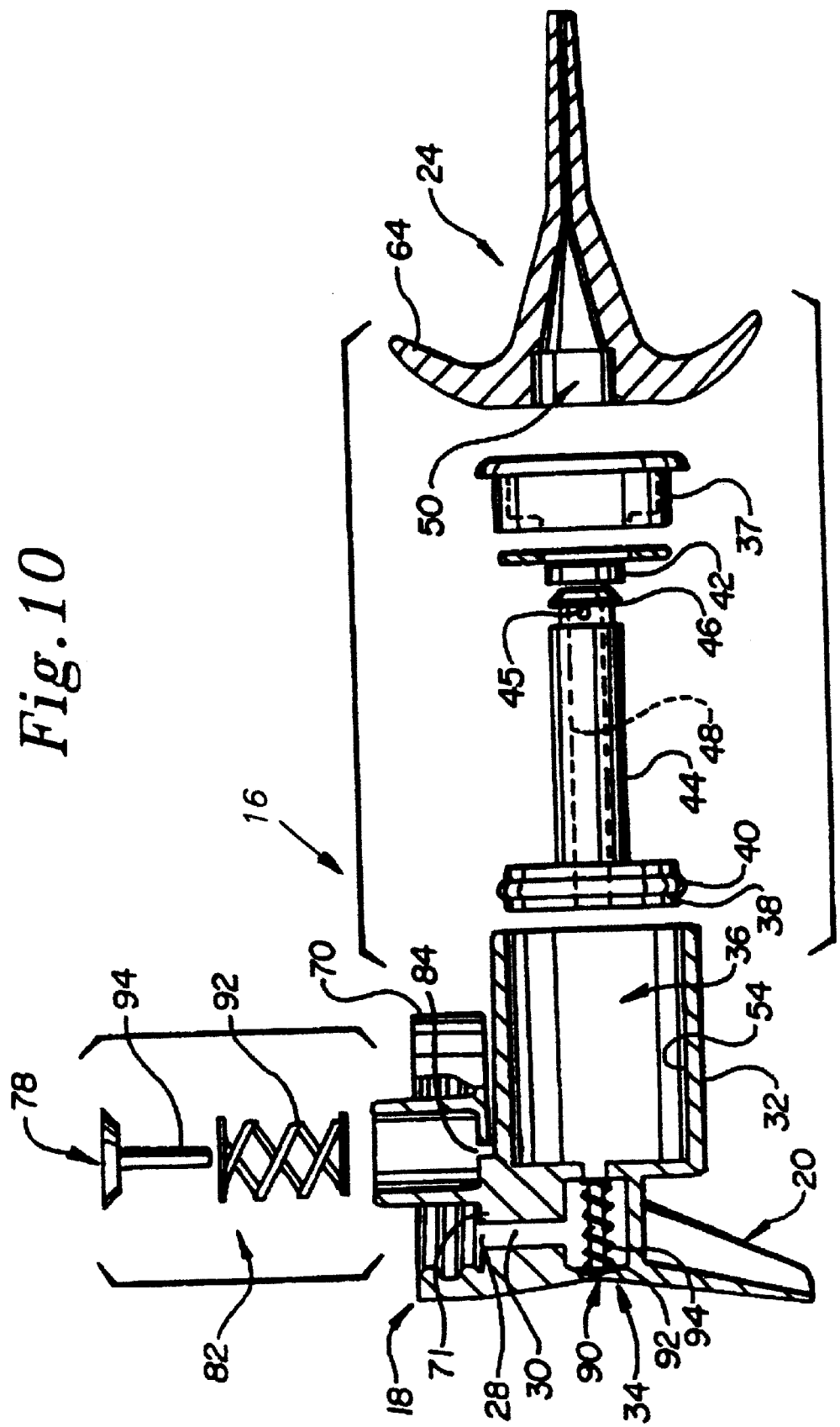
FIG. 10 is a side view, partially exploded and partially in cross-section for clarity, of the threaded bottle mount embodiment of FIG. 7.

The body member 20 is constructed to have a fluid communication channel 30, a dose cylinder 32, and a dose valve 34. The fluid communication channel 30 is communicatively connected to the fluid ingress channel 28 and to the dose cylinder 32 so that fluid flows from the fluid ingress channel, through the fluid communication channel 30, and into the dose cylinder 32. The dose cylinder 32 forms a cylinder for the compression and expansion stroke of the piston member 22. The dose cylinder 32 and piston member 22 are related to each other in such a way as to have a predetermined volume 36 or swept volume that corresponds to the desired dose of the dispensed fluid. As shown in FIGS. 10–11, this volume 36 may be varied by varying the width of the shoulder 35 integrally formed in the dose cylinder 32. Alternatively, it may be varied by interchanging the removable block 37 with one with a different width. Furthermore, a removable piston member 22 could be replaced with a piston member 22 that provides a different swept volume. Additionally, an adjustable dispensing mechanism 150 may be used to accurately dispense measured doses. For example, as shown in FIGS. 17–19, the adjustable dispenser mechanism 150 may include a stop member 152 having an engagement part, and may further include at least one abutment 154 formed on the piston member 22. The abutment 154 contacts the engagement part of the stop member 152 and limits the motion of the piston member 22.

As shown in FIGS. 6, 10–11, the dose valve 34 is positioned between the fluid communication channel 30 and the dose cylinder 32. The dose valve 34 permits fluid to flow only in the direction from the fluid communication channel 30 to the dose cylinder 32 when the expansion stroke of the piston member 22 causes a pressure differential between the fluid communication channel 30 and the dose cylinder 32, but will not permit fluid to flow from the dose cylinder 32 to the communication channel 30 during the compression stroke of the piston member. As shown in greater detail in FIGS. 10 and 11, a one-way helix valve 90 is used as the dose valve 34. The helix valve 90 includes a helical portion 92 that fits within the fluid communication channel 30 and a valve stem 94 moveably positioned within the helical portion 92 such that it will form a seal when the pressure in the dose cylinder 32 is greater than the pressure in the communication channel 30. It is anticipated that other pressure-sensitive, one-way valves could be used as the dose valve 34.

Figure 7:
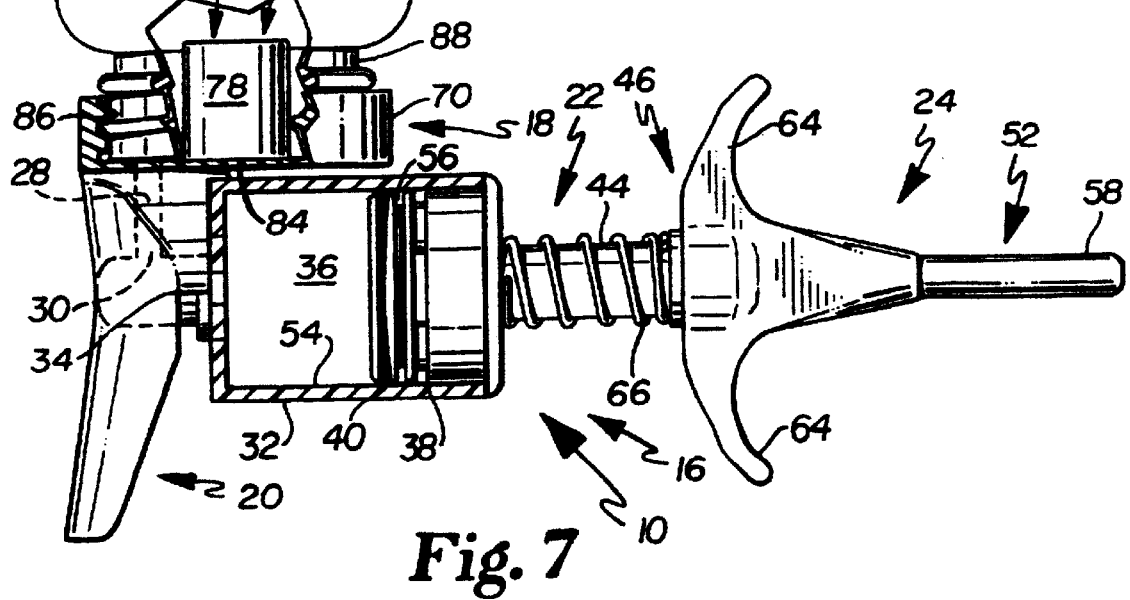
FIG. 7 is a side view, partially in cross-section, of a threaded bottle mount embodiment of the fluid dispenser apparatus of the present invention used to administer liquid from a wide-mouth threaded container.

As shown in FIGS. 6 and 7, the piston member 22 generally includes a piston head 38, an annular gasket 40, a piston valve 42, and a piston rod 44. A fluid egress channel 48 extends through the piston head 38 and piston rod 44 to a distal end 46 of the piston rod 44. The piston head 38 has an outer periphery sized and shaped to have a functionally sealing fit with the interior surface 54 of the dose cylinder 32. The piston head has a circumferential groove 56 about its outer periphery sized to receive the annular gasket 40. The gasket 40 provides the functionally sealing fit with the interior surface 54 of the dose cylinder 32. The piston valve 42 is positioned at the distal end 46 of the piston member 22. As shown in more detail in FIGS. 10 and 11, the piston valve 42 has a form of an elastomeric band that provides a one-way seal around the outlet ports 95 of the fluid egress channel 48. The piston valve 42 permits fluid to only flow out of the fluid egress channel 48 when the compression stroke of the piston member 22 increases the pressure in the fluid egress channel 48. The piston member 22 or plunger provides a non-conventional delivery system for the fluid. Whereas conventional syringes expel fluid through their barrel end, the present invention expels fluid through the piston member 22.

The trigger member 24 is attached to the distal end 48 of the piston rod 44. A nozzle channel 50 within the trigger member 24 is communicatively attached to the fluid egress channel 46 and extends through the nozzle portion 52 of the trigger member 24. As required by the pharmaceutical dispensing application, the nozzle portion 52 of any of the embodiments may have the form of an oral tip 58 for oral or intranasal applications, or it may take the form of an injectable tip 60, such as a Luer slip or Luer lock tip, that can be fitted with a needle 62 for injectable applications. The body member 20 may also include a needle storage holder or storage container 72. The trigger member 24 is formed with grips 64 that interface with an operator's fingers when the body member 20 is placed in the operator's palm. An operator squeezes his or her fingers to pull the trigger member 24 toward the body member 20. This action compresses the piston member 22 within the dose cylinder 32 and expels the dose volume of the fluid through the fluid egress channel 48, the piston valve 42, the nozzle channel 50, and out of the nozzle portion 52.

A spring 66 surrounds the piston rod 44 and extends between the trigger member 24 and the dose cylinder 34. The spring 66 biases the piston member 22 in an extended position and, upon the operator's release of the trigger member 24, will automatically produce the expansion stroke by returning the piston member 22 to the extended position. The expansion stroke draws the dose volume of fluid into the dose cylinder 32.

The figures show the piston member 22 and the trigger member 24 extending from the body member 20 at a near right angle. However, the piston member 22 and trigger member 24 could be aligned with the body member 20 such that it is in the general location of the shown position for the storage container 72.

Many elements of the dispenser 10 preferably are manufactured from a clear or relatively transparent plastic material. The body member and connection member are generally molded as a unitary piece of plastic, as is the piston member. This material provides a strong, light weight and inexpensive dispenser 10. Furthermore, the transparent nature of the material allows an operator to visually monitor the device in operation. The dispenser 10 is manufactured to be easily cleaned, sanitized and lubricated. However, it is also inexpensive enough to be considered semi-disposable; that is, it can be disposed after an application or a series of applications as warranted by the circumstances.

The Draw Off embodiment 12 shown in FIG. 1 has an injectable tip 60 for receiving a needle 62 as shown in FIG.

3. The body member 20 is constructed to have a storage container 72 designed to store spare and/or used needles. The storage container 72 is closed with a removable cap 74, plug or other closure. The Draw Off embodiment 12 is designed to dispense fluid from flexible or rigid bulk fluid source containers of various sizes and shapes. The connection member 18 is constructed with a fluid stem 68 that contains the fluid ingress channel 28. The fluid stem 68 is designed to receive a hose that provides a communicative path between the external fluid source container and the fluid ingress channel 28. The connection member 18 also has continuous side walls 70, which in this embodiment are flange-like.

Figure 3:
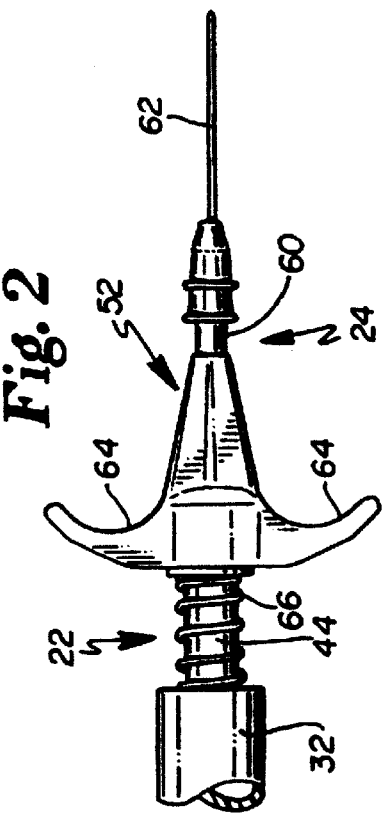
FIG. 3 is a side view of a needle attached to a trigger member.
Figure 4:
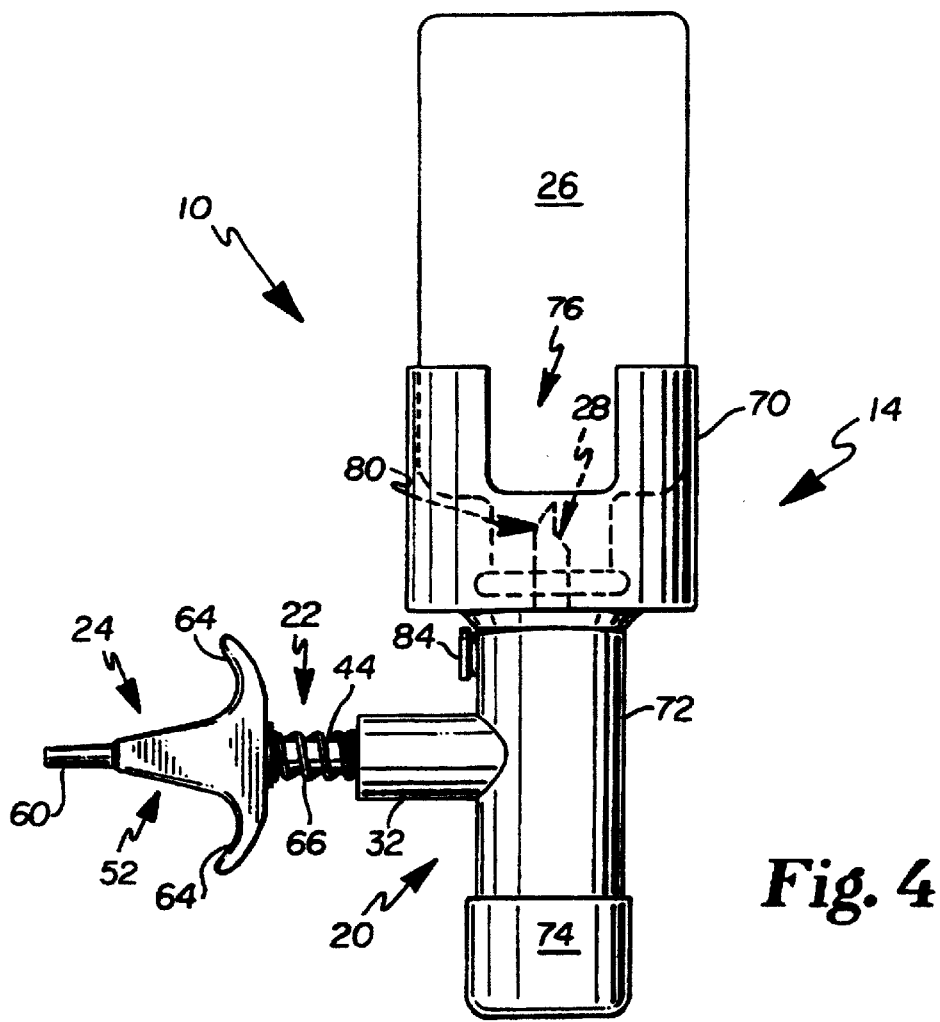
FIG. 4 is a side view of a spike embodiment of the fluid dispenser apparatus of the present invention used to administer fluid from a sealed end pharmaceutical bottle.
Figure 8:
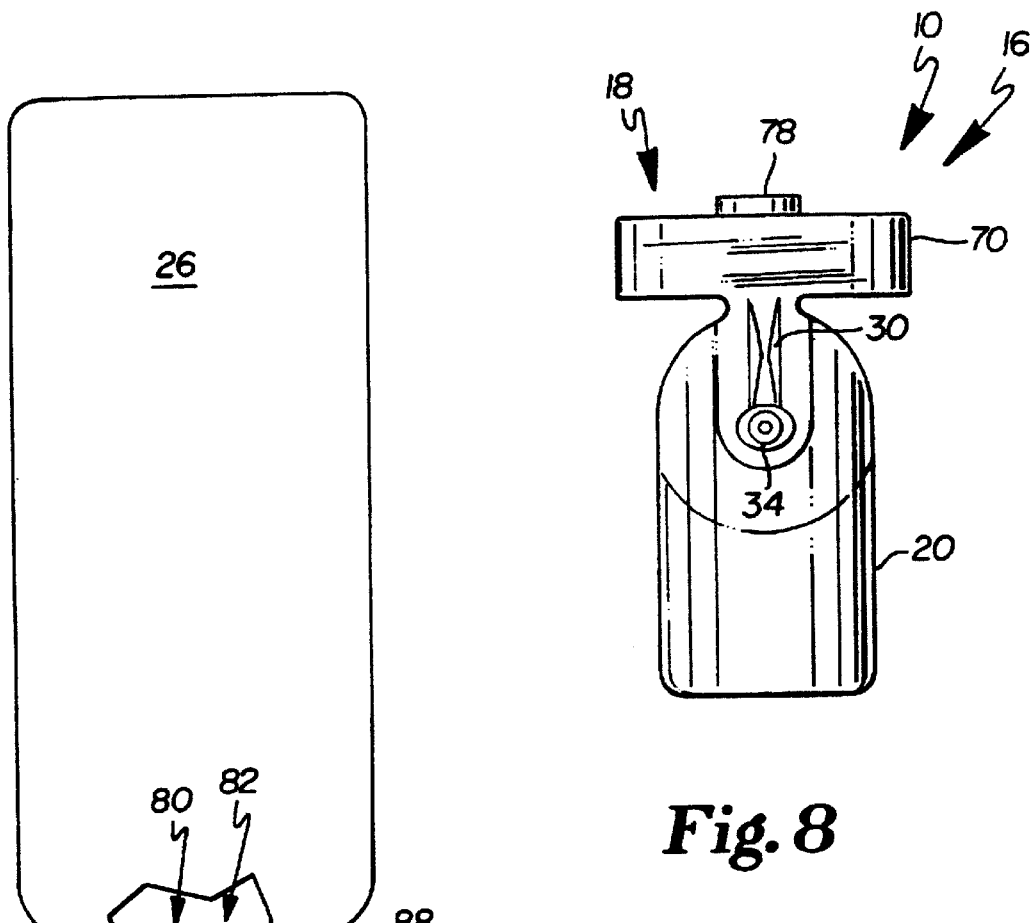
FIG. 8 is a rear view of the threaded bottle mount embodiment of FIG. 7.
Figure 20:
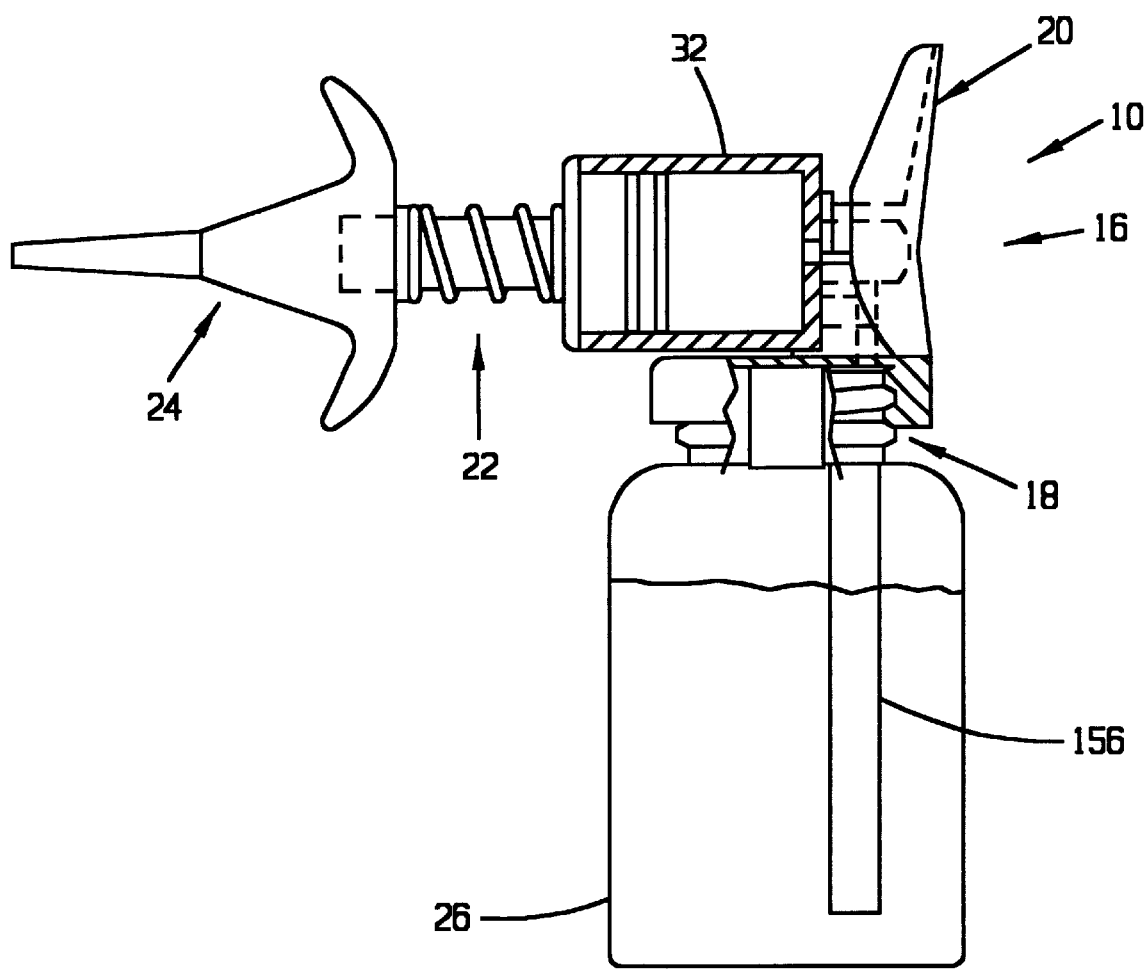
FIG. 20 is a side view, partially in cross-section, of an inverted threaded bottle mount embodiment of the fluid dispenser apparatus of the present invention.

The Spike embodiment 14 shown in FIGS. 4–6 is shown to have an injectable tip 60 for receiving a needle 62 as shown in FIG. 3. The body member 20 is constructed to have a storage container 72 designed to store spare and/or used needles. The storage container 72 is closed with a removable cap 74, plug or other closure. The Spike embodiment 14 is designed to directly mount a vile or other sealed end fluid source container 26 onto the dispenser 10. The connection member 18 is constructed with a spike 76 designed to puncture through the sealed end of a flexible or rigid fluid source container 26, and with a continuous side wall 70 designed to support the fluid source container 26 in a mounted position. The Spike embodiment includes an air intake system 78 that replaces fluid drawn from the fluid source container 26 with ambient air as an automatic venting function. The air intake system 78 provides for smoother fluid flow and easier operation by equalizing the pressure between the interior and exterior of the fluid source container 26. The air intake system 78 generally comprises a vent channel 80, an air valve 82, and an air intake port 84. The vent channel 80 provides the means for transferring ambient air from the air intake port 84, through the air valve 82, and into the fluid source container 26. A pressure differential is created between the outside and inside of the container 26 when fluid is dispensed. The air valve 82 allows air to enter the container 26 when there is a pressure differential, and it prevents fluid from flowing out of the container 26 the vent channel 80. The spike 76 contains both the fluid ingress channel 28 and the vent channel 80. The spike 76 may be formed to extend and remain in fluid communication with the contents of the fluid source container 26 if the dispenser 10 is used in an inverted position, as generally illustrated in FIG. 20.

As shown in FIGS. 11, 12 and 13, the air valve 82 may use different types of one-way pressure sensitive valves. FIGS. 11 and 12 show an air valve 82 that uses a wedge-like, elastomeric valve 96. The elastomeric valve 96 has a generally cylindrical shaped proximate end 98 and a distal end 100. The distal end 100 has a slit that is normally closed, thus preventing fluid from flowing out the air intake system 78, but opens relatively easily to allow air to flow into the container 26. Alternatively as shown in FIG. 13, a check valve 102 containing a check ball 104 and spring 106 could be use to provide the one-way valve function.

The Threaded Bottle Mount embodiment 16 shown in FIGS. 7–10 has an oral tip 58. This embodiment is designed to directly attach a bottle or fluid source container 26 onto the dispenser 10 by screwing it onto the connection member 18. The connection member 18 is constructed to have a form similar to an inverted bottle cap, including continuous side walls 70 having interiorly disposed threads 86 designed to mate with exteriorly disposed threads 88 on the container 26, such as a wide mouth threaded container. The connection member 18 has a bottom surface 71 disposed between and joined to the side walls 70. The connection member 18 is typically molded with the body member 20 as a unitary piece. The fluid ingress channel 28 is formed by an aperture in the bottom surface 71. The Threaded Bottle Mount embodiment includes an air intake system 78 that replaces fluid drawn from the fluid source container 26 with ambient air as an automatic venting function. The air intake system 78 provides for smoother fluid flow easier operation by equalizing the pressure between the interior and exterior of the fluid source container 26, which prevents the fluid from being suctioned back into the container 26 and possibly contaminating the medicinal source. The air intake system 78 generally comprises a vent channel 80, an air valve 82, and an air intake port 84. The vent channel 80 provides the means for transferring ambient air from the air intake port 84, through the air valve 82, and into the fluid source container 26. A pressure differential is created between the inside and outside of the container 26 when fluid is dispensed. The air valve 82 allows air to enter the container 26 when there is a pressure differential, but it prevents fluid from flowing out of the container 26 through the vent channel 80. The air valve 82 shown in FIG. 10 is a helix valve 90 that contains a helical portion 92 and a valve stem 94. It is anticipated that other one-way, pressure sensitive valves could be used. The connection member 18 is constructed to contain the vent channel 80. The bottle mount embodiment shown in FIG. 7 does not have a "stem" extending between the dose cylinder 32 and the fluid source container 26. Rather gravity pulls the contents of the fluid source container 26 over the fluid ingress channel aperture and, upon an expansion stroke, into the dose cylinder 32. FIG. 20 illustrates an inverted bottle mount embodiment. The fluid is drawn up into the dose cylinder 32 through an extended stem 156 upon each expansion stroke.

The protective cap embodiment 11 include a protective cap 162 sized to fit on the connection member 18 and cover the fluid source container 26, such as a closed end pharmaceutical bottle 164 as shown in FIGS. 14 and 16. The protective cap 162 has a margin 166 that has a slightly greater diameter than the diameter of the continuous wall 70. The margin 166 is sized to promote a secure fit between the protective cap 162 and the connection member 18 and to promote quick and easy removal and reattachment of the protective cap 162 to the connection member 18. The protective cap 162 is preferably formed from polyethylene, polypropylene, or another hard plastic which provides protection against accidental breakage of the fluid source container 26. A sleeve 170, preferably made of foam rubber, may be inserted within the continuous wall 70 and the protective cap 162. The sleeve 170 surrounds the fluid source container 26. The sponge-like sleeve 170 provides additional protection or cushion against accidental breakage of the fluid source container 26. Additionally, the sleeve 170 insulates the contents of the fluid source container 26 from the environment in order to keep cool contents cool and warm contents warm.

Referring to FIGS. 17–19, the adjustable dispensing mechanism embodiment 15 includes an adjustable dispensing mechanism 150 for dispensing measured doses. The dispensing mechanism 150 is designed to limit the motion of the piston member 22 within the dose cylinder 32. A stop member 152 is attached to the dispenser 10 in a predetermined position with respect to the dose cylinder 32. The piston member 22 is formed with a plurality of abutments 154 spaced axially around the piston rod 44. At least one projection or engagement part 192 extending from the stop member 152 relates or contacts with these abutments 154.

The abutments 154 are preferably formed from predetermined arrangement of a plurality of grooves 194 formed in the surface of the piston rod 44. Preferably, the grooves 194 extend longitudinally along the plunger and are axially spaced around the circumference of the piston rod 44. Furthermore, it is preferable that a first end of the grooves are circumferencially aligned along the plunger at a point corresponding to the completion of a compression stroke. The respective end walls at the second end of each of the grooves form the abutments. A circumferencial groove 196 preferably intersects each of the longitudinal grooves 194 at a point so that the projection 192 extends into the circumferencial groove 196 when the piston rod 44 has completed a compression stroke. Each of the differently-sized longitudinal grooves 194 extend away from the circumferencial groove 196. The projection 192 fits within the grooves 194 and 196, tracks within the longitudinal grooves 194 during the compression and expansion strokes, and tracks from one longitudinal groove to another through the circumferencial groove 196.

During an expansion stroke, the piston rod 44 will move until the projection 192 contacts the end wall or abutment 154 for that groove. Therefore, the length of a longitudinal groove 196 determines the movement of the piston rod 44, and thus corresponds to a predetermined volume of fluid that is drawn into the dose 32 cylinder during an expansion stroke. During the compression stroke, the piston member 22 expels the predetermined volume of fluid from the dose 32 cylinder. After the compression stroke, the projection 192 is in alignment with the circumferencial groove 196, allowing the piston member 22 and projection 192 to be rotated with respect to each other until the projection 192 aligns with the longitudinal groove 194 that corresponds to a new desired dose volume. Alternatively, rather than using a circumferencial groove 196, the projection 192 could be retracted out of a longitudinal groove, realigned with another longitudinal groove, and reinserted. Another alternative is to have a plurality of retractable projections pre-aligned with the longitudinal grooves, wherein a desired dose volume is selected by inserting a projection into the desired groove. The stop member 152 shown in FIGS. 17–19 has two diametrically-opposed projections or engagement parts 192. Similarly, the piston rod 44 has sets of grooves, wherein each set is comprised of two diametrically-opposed grooves of equal length. The diametrically-opposed projections 192 evenly distribute the biasing force and prevents the piston member 22 from becoming skewed within the dose cylinder 32.

The stop member 152 forms an annular cap having an aperture sized to permit the plunger to slidingly fit within the cap and is sized to fit over an edge of the dose cylinder 32. The stop member 152 and its projection 192 are preferably rotatable on the edge. The stop member 152 may be held in place using the spring 66 as shown in FIGS. 17 and 19, or alternatively the stop member 152 may be rotatably coupled to the dose cylinder 32. If the stop member 152 is affixed to the dose cylinder 32, the piston member 22 should be rotatable. A scale or other markings 198 correlating to the dose volume for an aligned groove could be provided on the dose cylinder 32 and stop member 152, or alternatively on the piston rod 44 and stop member 152. A plug 180 fits within the dose cylinder 32. The piston rod 44 slides within an aperture of the plug 180. The plug 180 preferably has projections that fit within the longest set of longitudinal grooves 194, which corresponds to the longest stroke that can be selected by a user. The projections within the plug 180 prevent the piston member 22 from rotating within the dose cylinder 32. The stop member 152 is rotatable about the plug 180 and the dose cylinder 32 when the projection 192 is within the circumferencial groove 196 of the piston. A user limits the stroke of the piston member 22 by rotating the stop member 152 until its projection(s) align with shorter longitudinal grooves 194. The piston member 22, the plug 180 and the stop member 152 are all easily removed from and reattached to the dose cylinder 32.

In the embodiment shown in FIGS. 17–19, the circumferencial groove 196 intersects each of the longitudinal grooves 194 near the base of the trigger member 24. The projection 192 of the stop member 152 tracks from one longitudinal groove to another via the circumferencial groove 196. Thus the dose volume drawn into the cylinder can be adjusted by squeezing the trigger member completely so that the projection enters the circumferencial groove, aligning the projection with a desired groove using the scale 198, and releasing the trigger member until the projection contacts the corresponding abutment.

Figure 21:
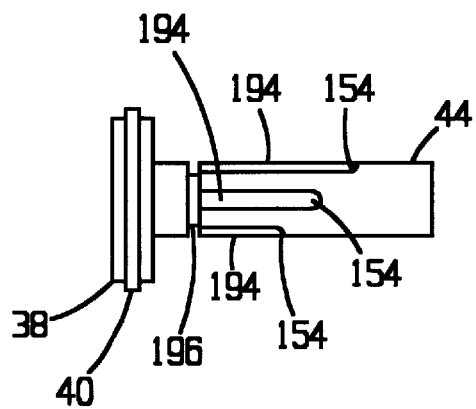
FIG. 21 is a side view of an alternative piston member for the adjustable dispensing mechanism embodiment of the fluid dispenser of the present invention.

Alternatively, as illustrated in FIG. 21, the circumferencial groove 196 may intersect each of the longitudinal grooves 194 corresponding to the place on the piston rod 44 proximate to the projection 192 when the piston member 22 has undergone a completed expansion stroke. The projection 192 extends inwardly from the stop member 152 and limits the compression stroke of the piston member 22, depending on the particular groove 194 in which the projection 192 has entered. Thus, this embodiment can be used to meter desired volumes of material from pre-filled dispenser. Cough syrup, for example, may be metered or dispensed in this manner. The length of each groove 194 corresponds to an incremental increase in the volume dispensed. In operation, the projection 192 is initially aligned with the shortest groove and the piston member 22 is pushed into the dose cylinder 32 to distribute the first desired volume interval. The piston member 22 is then retracted back to its original position where the projection 192 is aligned with the circumferencial groove 196. The piston member 22 is then rotated so that a longer groove 194 is aligned with the projection 192. The piston member 22 is then pushed into the dose cylinder 32 an incremental amount further than the first time, which distributes a second desired volume interval. This process can be repeated until the dispenser is empty.

Figure 22:
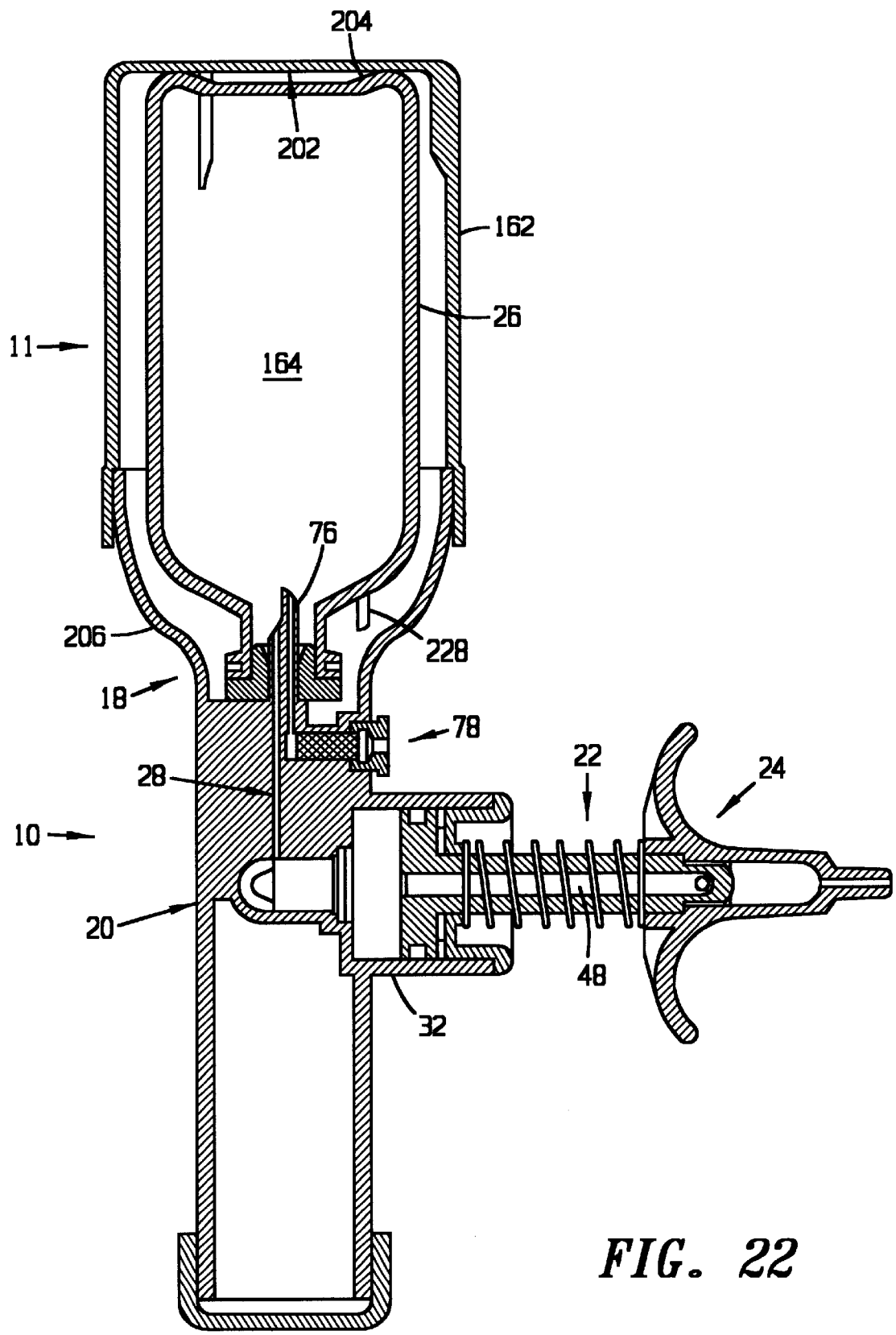
FIG. 22 is a cross-section of the protective cap embodiment, wherein the protective cap is adapted to provide means for stabilizing a fluid container of a predetermined size.
Figure 23:
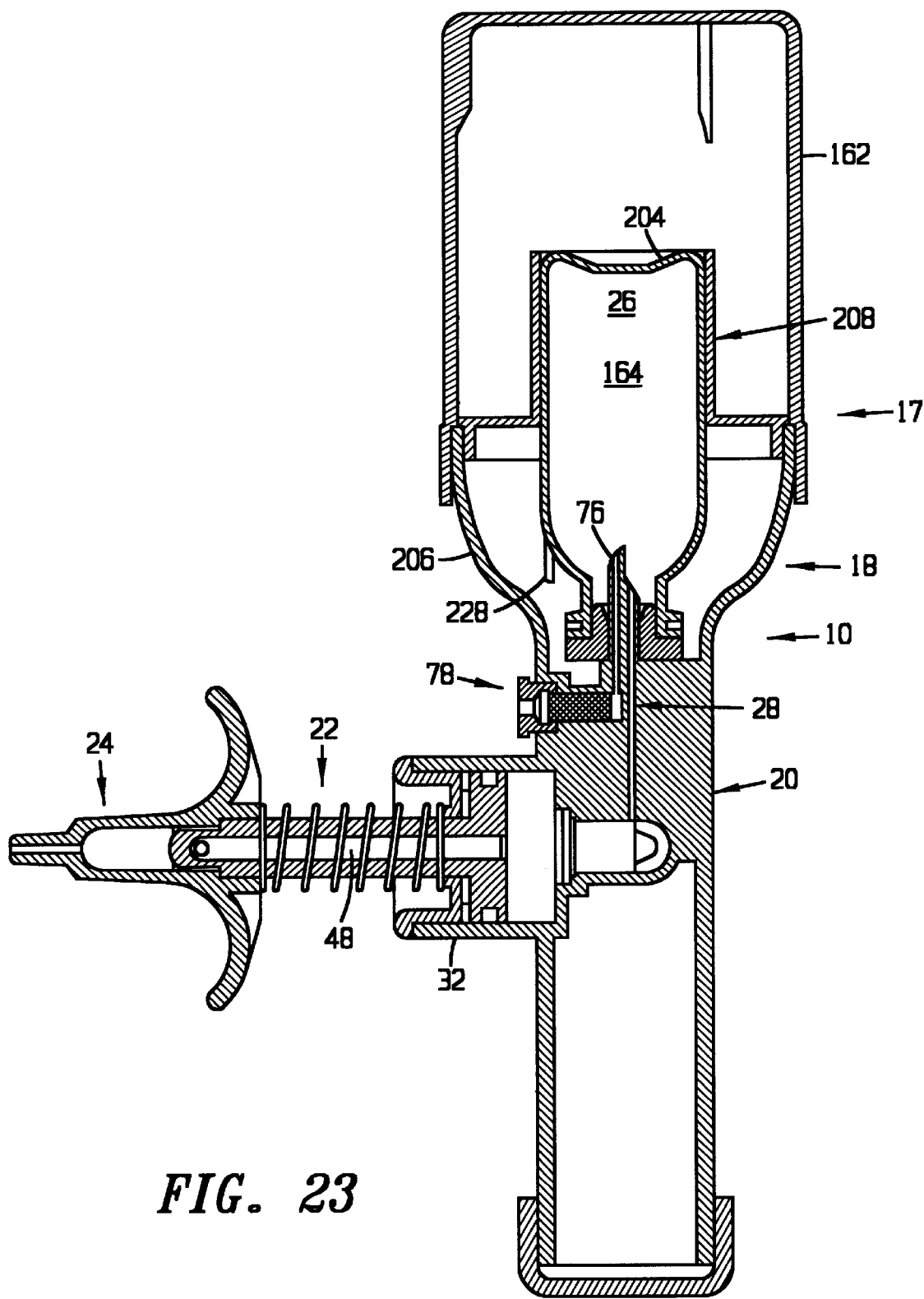
FIG. 23 is a cross-section of the bottle guide embodiment including a bottle guide adapted to provide means for stabilizing a smaller fluid container.
Figure 24:
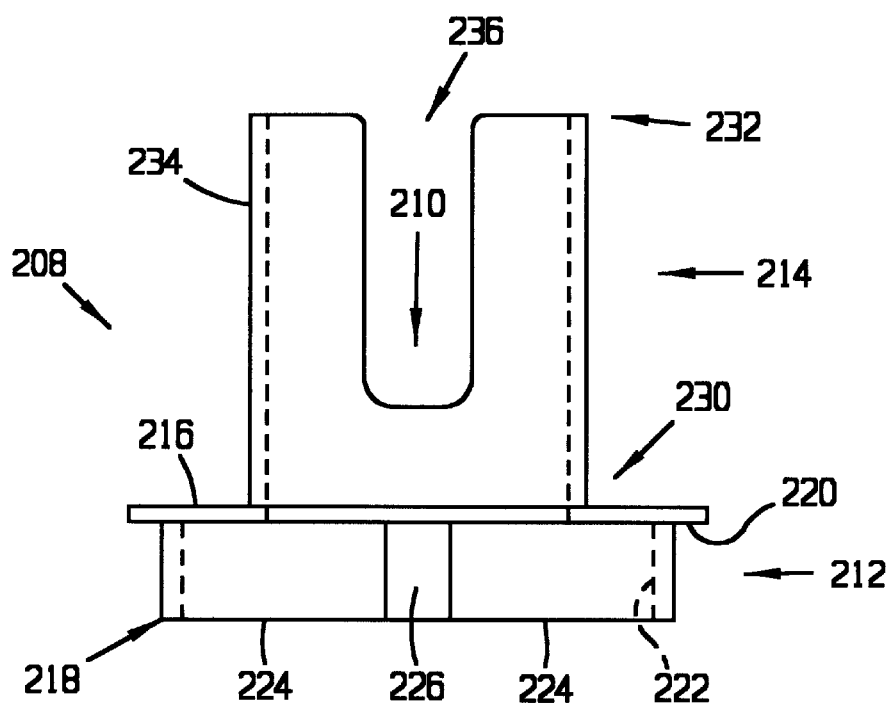
FIG. 24 is a side view of the bottle guide shown in FIG. 23.
Figure 26:
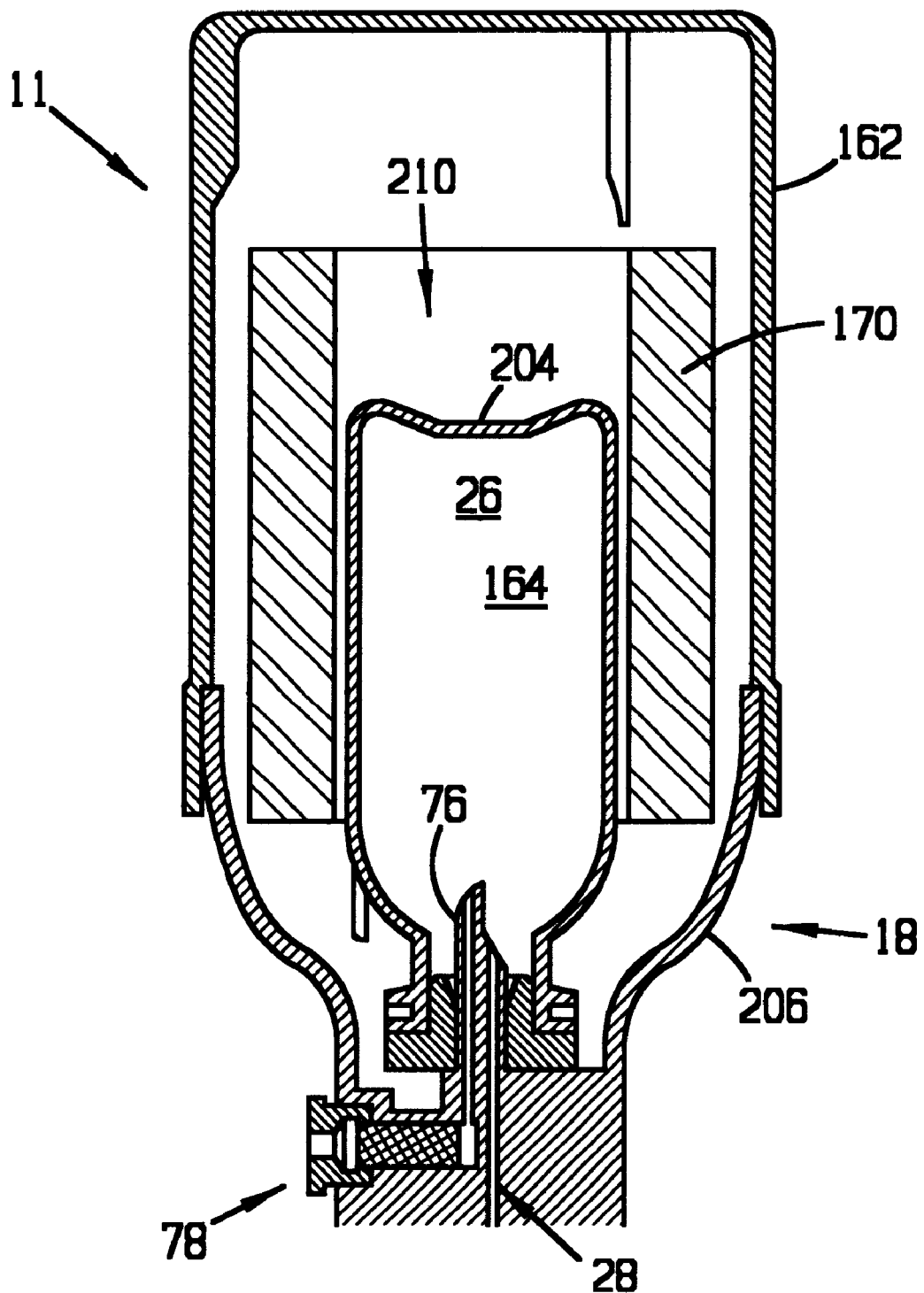
FIG. 26 is a cross-section of the protective cap embodiment, wherein a sleeve insert is adapted to provide means for stabilizing a smaller fluid container.

FIGS. 22–26 generally show and illustrate several means for stabilizing fluid containers mounted to the connection member 18. For example, the protective cap 162 may be sized and otherwise adapted for stabilizing a fluid container as shown in FIG. 22. The inner top surface 202 of an installed protective cap 162 contacts the base 204 of the mounted bottle 164 to prevent the bottle 164 from tipping during use. However, if a smaller bottle 164 is used as shown in FIGS. 23 and 26, other means for stabilizing the fluid container 26 or bottle 164 are required. For example, in FIG. 26, a sleeve insert 170, such as a rubber sleeve, may be placed inside of the protective bottle cradle 206 that forms part of the connection member 18. The sleeve insert 170 provides a guide when the bottle 164 is being mounted onto the spike 76, and further prevents the bottle 164 from tipping during use. FIGS. 24–25 illustrate the bottle guide embodiment 17 of the dispenser 10 that uses a bottle guide 208 or removable guide as a means for stabilizing containers. The bottle guide 208 is adapted for being removably seated on the protective bottle cradle 206 and for providing a container passage 210 adapted to receive a bottle or fluid container and precisely align the container with the spike 76. The bottle guide 208 generally comprises a platform portion 212 and a guide portion 214, both of which have voids or apertures that form the container passage 210. The platform portion 212 includes a platform surface 216 and a continuous side wall 218 formed beneath the platform surface 216 to form a circumferential lip 220 that rests on the top edge of the bottle cradle 206. The side wall 218 preferably includes a continuous inner rim 222 adapted to provide strength and stability to the platform surface 216 and a set of outer rim segments 224 spaced along the inner rim 222 to form keyways 226 between the outer rim segments 224. The keyways 226 are constructed and arranged to receive and engage internal ribs or projections 228 within the bottle cradle 206 and prevent the bottle guide 208 from twisting or spinning on the top edge of the bottle cradle 206. The guide portion 214 generally includes a proximal portion 230 and a distal portion 232. The proximal portion 230 is preferably formed as a continuous wall to form part of the container passage 210. The distal portion 232 preferably includes extension fingers 234 that also form part of the container passage 210. The fingers 234 are spaced to form voids or windows 236 through which an operator can view and monitor the fluid in the bottle 164 as it is being dispensed, thus enabling the operator to visually verify the dispensed dosages and detect an empty or near empty bottle 164.

Referring to FIGS. 27–32, the sealed chamber embodiment 19 generally includes a sealed chamber or reservoir 250 mounted within the cradle 206 of the dispenser 10. The sealed chamber 250 generally includes a first tip 252, a second tip 254, a movable seal 256 that divides the chamber 250 into a first reservoir 258 and a second reservoir 260. The first tip 252 has a passage 262 that is in fluid communication with the first reservoir 258 and the second tip 254 has a passage 264 that is in fluid communication with the second reservoir 260. The figures illustrate tips 252 and 254 designed as a Luer-Slip connectors. It is anticipated that other connectors, including but not limited to Luer-Lock connectors, may be used. Although the specific design of the tips is not critical, the tips 252 and 254 are similar to each other, enabling each tip to be received by the dispenser 10 in a manner that places the passages 262 and 264 in the tips into fluid communication with the fluid ingress channel 28 of the dispenser 10. The other tip is in fluid communication with a fluid source via a hose or other conduit. The movable seal 256 is similar to a plunger head, using an o-ring to form a circumferential seal with the interior of the sealed chamber 250. The seal 256 has a width sufficient to prevent it from twisting within the sealed chamber 250.

Figure 27:
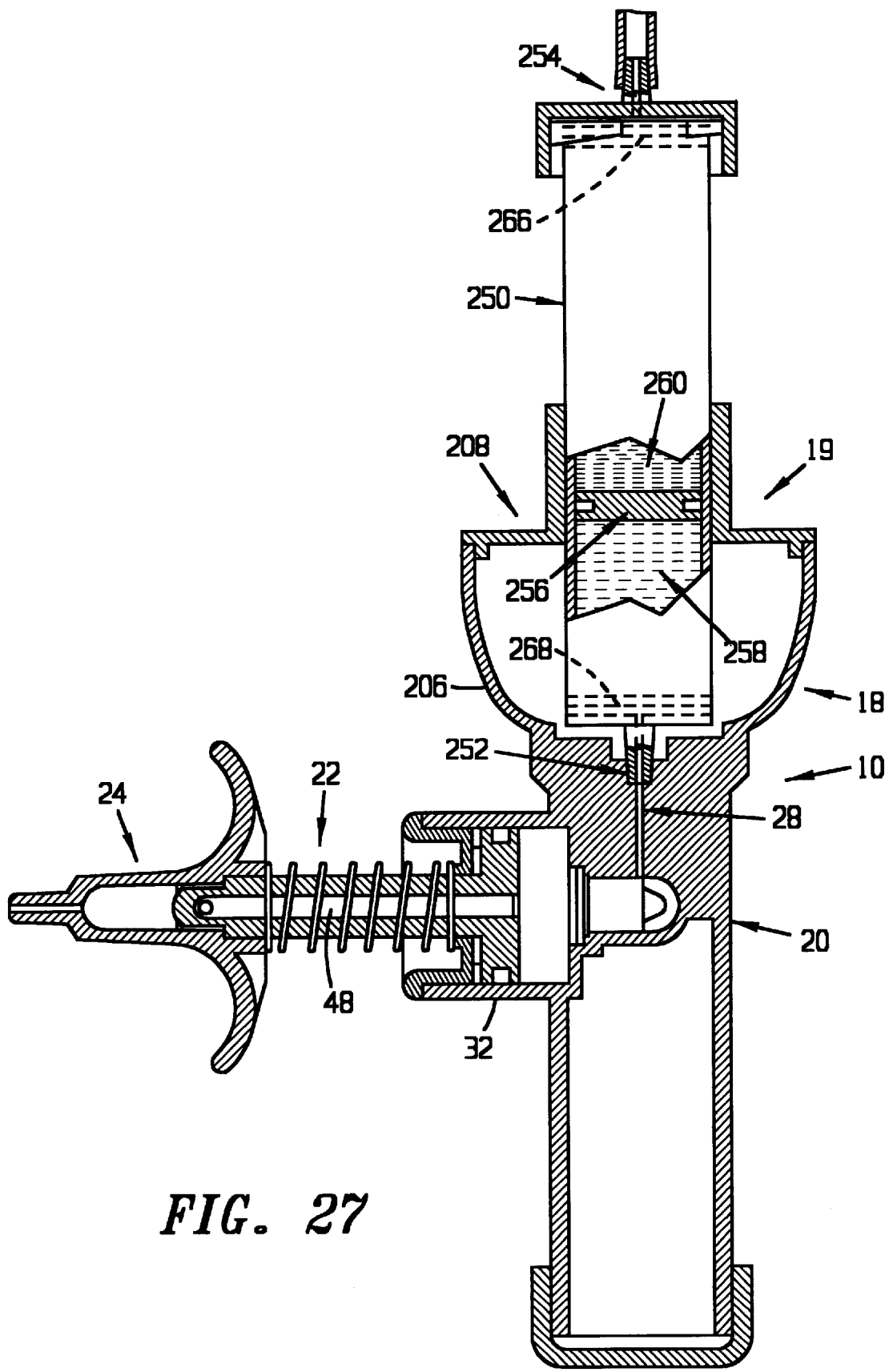
FIG. 27 is a cross-section of a sealed chamber embodiment, wherein the sealed chamber is oriented in a first position.
Figure 28:
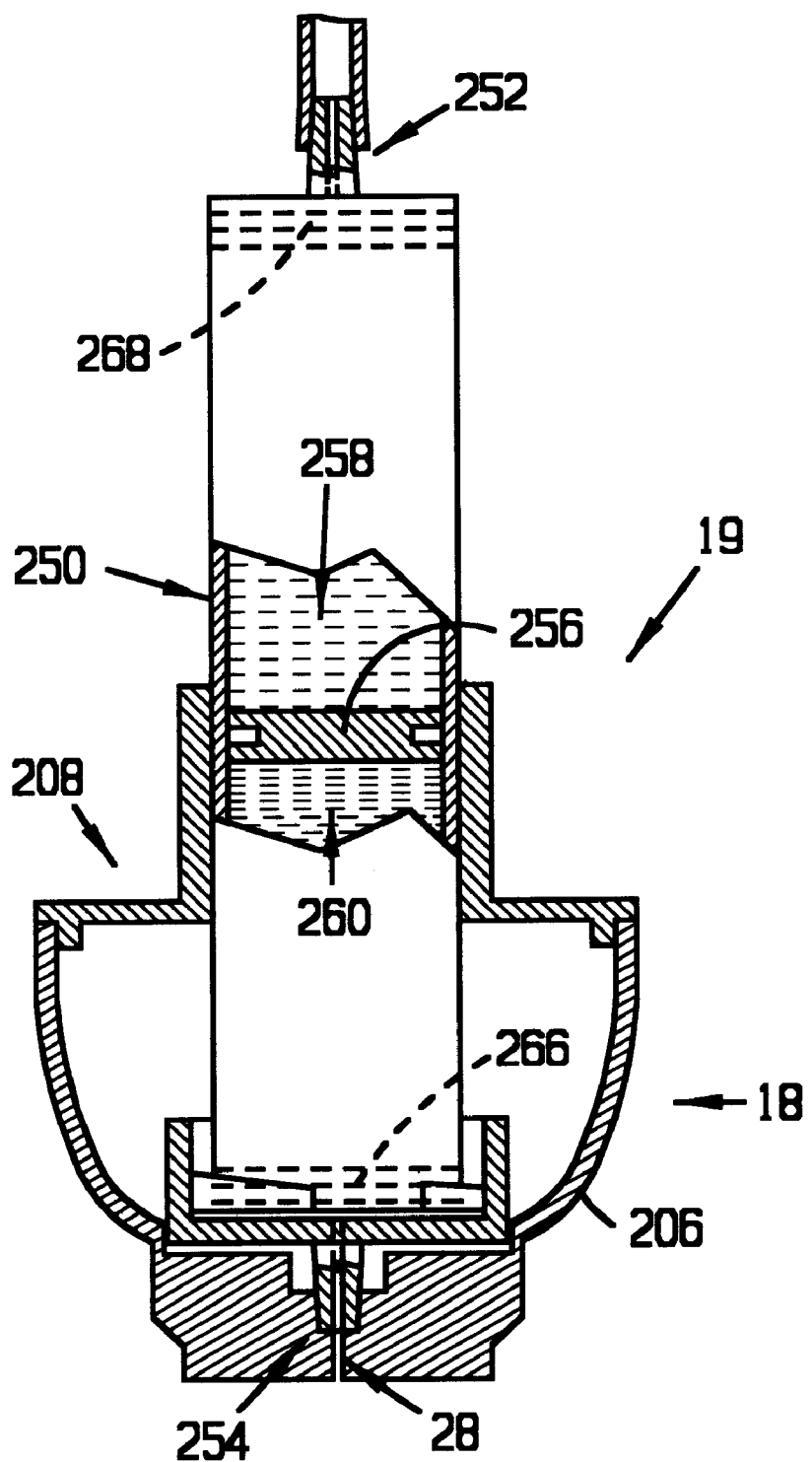
FIG. 28 is a cross-section of the sealed chamber embodiment, wherein the sealed chamber is oriented in a second position.
Figure 29:
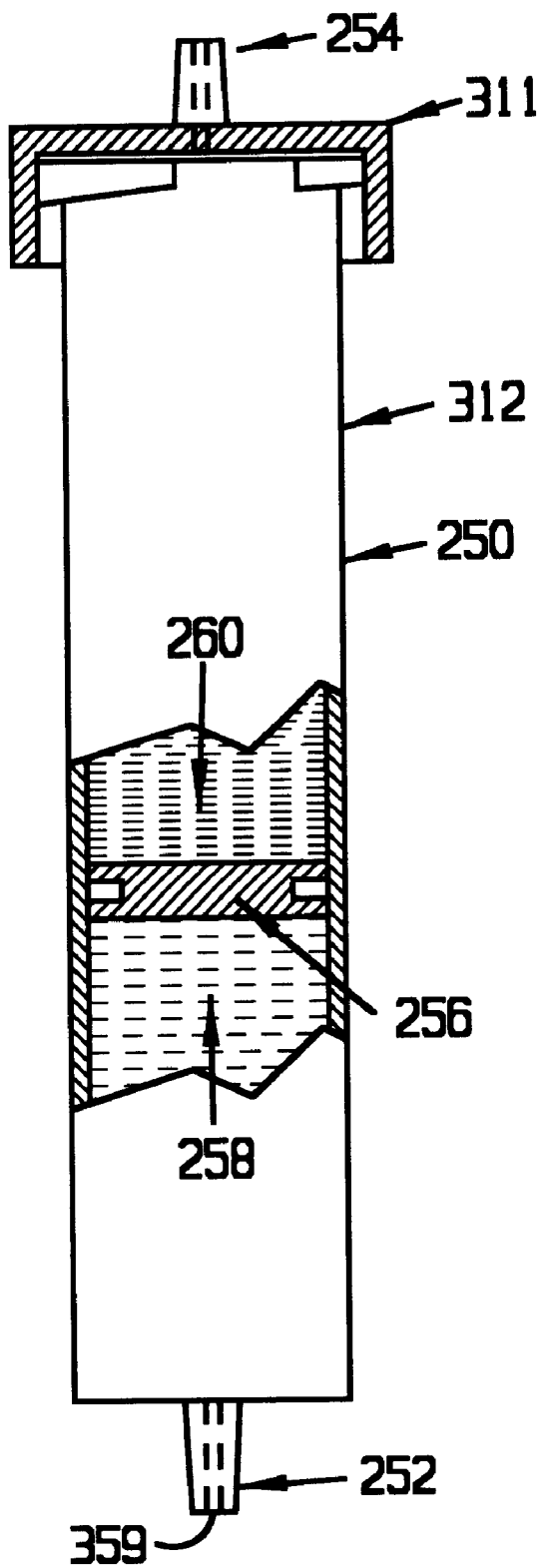
FIG. 29 is a side view, partially in cross-section, of a sealed chamber.

Referring to FIG. 27, the piston action of the dispenser 10 creates a vacuum within the fluid ingress channel 28 proximate to the first tip 252. This vacuum draws fluid from the first reservoir 258 through the first tip 252 and into the channel 28, which causes the movable seal 256 to slide from an initial position 266 near the second tip 254 to a final position 268 near the first tip 252. This motion of the seal 256 creates a vacuum in the second reservoir 260 that causes fluid to be drawn in from an external fluid source through the second tip 254 into the second reservoir 260 to completely fill the sealed chamber 250 as the first reservoir 158 empties. This vacuum also helps secure the sealed chamber 250 to the connection member 18 of the dispenser 10. A removable guide 208, described above as a bottle guide, may also be used to stabilize the sealed chamber 250 in position within the cradle 206. Once the seal 256 reaches the final position 268, the sealed chamber 250 can be removed, and as illustrated in FIG. 28, inverted and replaced onto the connection member 18 of the dispenser 10. The piston action then draws fluid from the second reservoir 260 into the channel 28, which causes the seal 256 to move from an initial position 268' to a final position 266', and causes fluid to be drawn in from the external fluid source through the first tip 252 into the first reservoir 258 to completely refill the sealed chamber 250. The sealed chamber 250 preferably has graduated markings that enable an operator to monitor the delivered dosages. These dosages are accurate because air is removed from the system and all of the conduits or channels are filled with noncompressible fluid. Furthermore, this embodiment is efficient because, even as fluid is being dispensed out of the sealed container 250 through piston action, the same piston action refills the sealed container 250.

Figure 30:
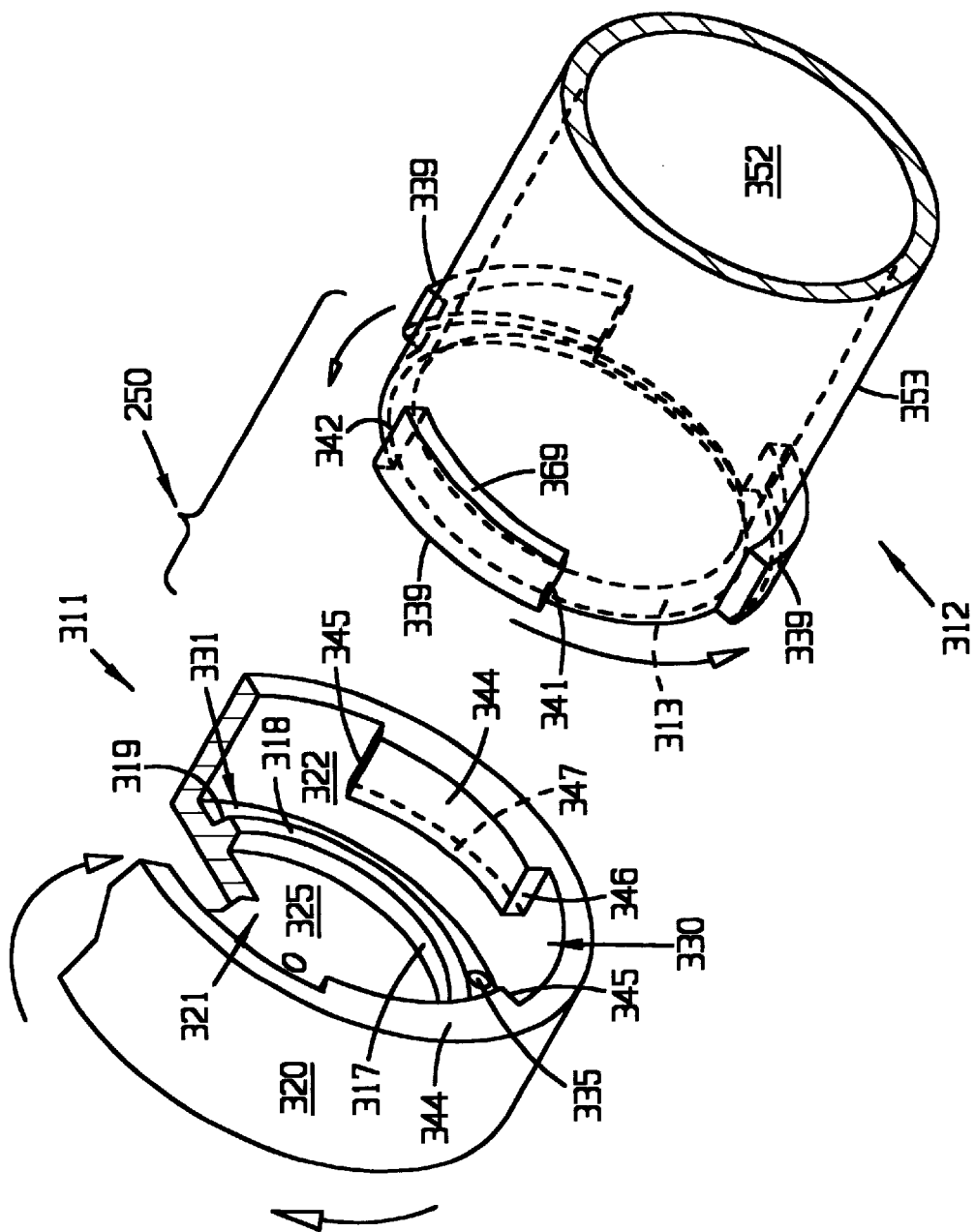
FIG. 30 is an exploded perspective view of the reservoir top edge and the closure cap shown partially in cross-section to illustrate the essential parts of the cap.

The sealed chamber 250 may take a variety of forms. In the example illustrated in the figures, the sealed chamber 250 is similar to the pressurized barrel injector described in U.S. Pat. No. 5,887,769, assigned to applicants' assignee, and incorporated by reference herein. The chamber generally comprises a basil or cap 311 and a syringe-like barrel 312. The end of the barrel 312 near the tip 252 may either be tapered or flat, as shown in the figures. The surface proximate to the tip 254 for the cap will similarly be either tapered or flat so that the shape at both ends of the chamber 250 are similar. The cap 311 is preferably made of a rigid material such as ABS plastic. It comprises a top surface 323 and a continuous side wall extending at a right angle to the top surface 323. The cap top surface 323 and side wall 320 define an interior cavity 321. The reservoir 312 has a cylindrical, elongated body. As shown in FIG. 30, a reservoir inner wall surface 352 terminates at the proximal end in a beveled surface 313. An outer reservoir wall surface 353 terminates at the proximal end in a plurality of tabs 339. The barrel 312 may be constructed of a polymeric material.

Figure 31:
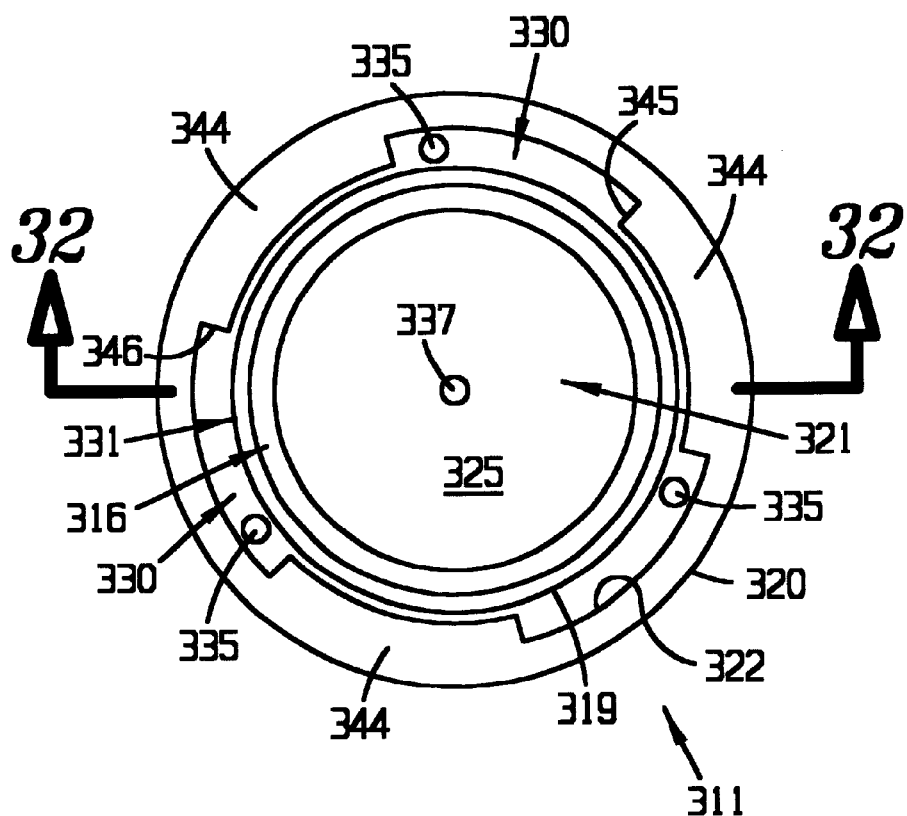
FIG. 31 is a bottom view of the closure cap.

Referring also to FIG. 31, the interior 321 of the cap 311 is defined by a surface 325 and a inner wall surface 322. Surface 325 comprises an annular sealing ring 316, a channel or groove 331, and a plurality of protruding nodes 335 that are evenly disposed about the groove 331. The inner surface 322 of the cap's side wall 320 comprises a plurality of locking tabs 344 that extend outwardly toward the longitudinal axis of the cap 311. The inner wall surface 322 is further defined by an a plurality of open spaces 330, a space 330 being between the leading end 346 of a tab 344 and the trailing end 345 of the adjacent locking tab 344. The convex nodes 335, being approximately 1/16 inch in diameter, extend from the top wall surface 325 into the interior cavity 321 approximately 0.10 inches and are located approximately 1/4 inch (0.075 mm) forward of a leading end surface 346 of a respective locking tab 344.

Figure 32:
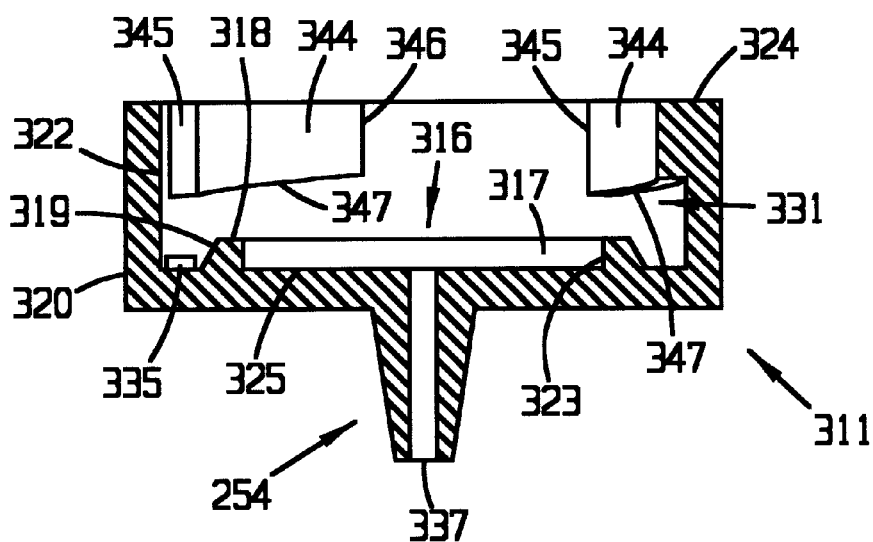
FIG. 32 is a cross-section of the cap taken along section line 32—32 of FIG. 31.

Referring to FIG. 30, the cap 311 is secured to the barrel 312 by first aligning the external reservoir tabs 339 with the cap's open spaces 330 and sliding the tabs 339 vertically through the open space 330 until the tabs engage the inner groove 331. The interior groove or channel 331 is defined by the surface 325, the inner wall surface 322 and a beveled side wall 319 of the annular planar sealing ring 316. As is best shown in FIGS. 30 and 32, the horizontal top surface 347 of each locking tab 344 ascends from right to left. The vertical leading end surface 346 of each locking tab 344 measures approximately 3/8 inch and the trailing vertical end wall 345 of each locking tab 344 is approximately 9/16 inches high. The cap 311 is then twisted in a counterclockwise direction until the declining bottom surface 369 of the external tab 339 has passed over the inclined top surface 347 of the locking tab 344. The external tab 339 traveling through the channel 331 is compressed into the diminishing space between the inclined horizontal top surface 347 of the locking tab 344 and the bottom surface 325 of the cap 311.

With the external tab 339 advanced to this position in the interior groove 331, the trailing end 345 of each respective locking tab 344 has passed over and is adjacent to a node or detent 335. When the cap 311 is tightened onto the barrel 312, the beveled surface 319 of the annular sealing ring 316 is in full contact with the beveled top edge 313 of the reservoir and a seal is made between the cap 311 and the barrel 312. The tabs 339 end surfaces 342 bypass the nodes 335 thereby creating a detent that must be forcibly overcome to disengage the cap 311 from the reservoir 312. The nodes 335 thereby block and prevent the barrel's 312 external tabs 339 from backing out of the interior groove 331 and thus maintains the integrity of the seal between the cap 311 and the barrel 312.

The annular sealing rib 316, as shown in FIGS. 30–32, comprises an inside vertical wall 317 that extends into the cap interior 321 approximately 3/32 inch (0.025 mm) from the top wall 323 of the cap 311, a narrow bottom surface 318 and an outside beveled wall 319 that angles inwardly toward the longitudinal axis of the cap 311 at approximately 28°.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

What is claimed is:

1. A fluid dispenser, comprising:
   (a) a body member having a fluid communication channel and a dose cylinder of a predetermined volume, said fluid communication channel being communicatively connected with said dose cylinder;
   (b) a fluid egress conduit communicatively connected to said dose cylinder;
   (c) a dose valve positioned and arranged to govern fluid flow from said fluid communication channel to said dose cylinder;
   (d) a piston valve positioned and arranged to govern fluid flow out of said fluid egress conduit;
   (e) a piston member having a piston head, a distal end and a piston rod connecting said piston head to said distal end, said piston head being sealingly disposed within said dose cylinder;
   (f) a trigger member attached to said distal end of said piston member; and
   (g) a connection member connected to said body member and adapted to receive a fluid container, and comprising means for stabilizing said fluid container on said connection member, said fluid container being in fluid communication with said fluid communication channel, and wherein said fluid container is a bottle with base, said dispenser further including a protective cap sized to fit on said connection member and cover said bottle, said protective cap having an inner surface that contacts said base of said bottle, said means for stabilizing said fluid container on said connection member being formed by said inner surface of said protective cap.

2. The fluid dispenser of claim 1, further comprising a sealed chamber mounted on said connection member, said sealed chamber having a first tip, a second tip, and a movable seal positioned within said sealed chamber, said movable seal forming a first reservoir proximate to and in fluid communication with said first tip and a second reservoir proximate to and in fluid communication with said second tip.

3. The fluid dispenser of claim 2, wherein one of said tips is in fluid communication with said fluid communication channel and the other of said tips is in fluid communication with an external fluid source.

4. The fluid dispenser of claim 3, wherein said tips have an identical shape and both of said tips are adapted to be selectively connected in fluid communication with said fluid communication channel and with said external fluid source.

5. The fluid dispenser of claim 4, wherein said tips are formed by Luer-Slip connectors.

6. The fluid dispenser of claim 4, wherein when said sealed chamber is in a first orientation, said dispenser drawing fluid out of said first reservoir and moving said movable seal from a first initial position to a first final position thus drawing fluid into said second reservoir, said sealed chamber being removed, inverted and replaced, said dispenser drawing fluid out of said second reservoir and moving said movable seal from a second initial position to a second final position thus drawing fluid into said first reservoir.

7. The dispenser of claim 4, wherein said sealed chamber being formed by a barrel reservoir and a cap, said barrel reservoir having an open end and a second end forming one of said tips, said cap being adapted for sealingly engaging said open end of said barrel reservoir, said cap further forming the other of said tips.

8. The dispenser of claim 7, further comprising a removable guide positioned on said connection member, said removable guide being adapted for stabilizing said sealed chamber on said connection member.

9. The dispenser of claim 7, wherein said cap is a cylindrical cap having a top surface of a predetermined perimeter, a continuous side wall disposed at said top surface perimeter and extending at a right angle therefrom, said top surface and said wall defining an interior cavity, said cap further having a fluid tip passage disposed in said cap top surface, said barrel reservoir being a cylindrical barrel reservoir having an open proximal end, said proximal end adapted for connection to said cap in said interior cavity thereof and comprising an outer surface and an inner surface, said inner surface having a sealing beveled top edge, and said barrel reservoir further having a closed distal end, said distal end having a fluid tip passage.

10. A fluid dispenser, comprising:
   (a) a body member having a fluid communication channel and a dose cylinder of a predetermined volume, said fluid communication channel being communicatively connected with said dose cylinder;
   (b) a fluid egress conduit communicatively connected to said dose cylinder;
   (c) a dose valve positioned and arranged to govern fluid flow from said fluid communication channel to said dose cylinder;
   (d) a piston valve positioned and arranged to govern fluid flow out of said fluid egress conduit;
   (e) a piston member having a piston head, a distal end and a piston rod connecting said piston head to said distal end, said piston head being sealingly disposed within said dose cylinder;
   (f) a trigger member attached to said distal end of said piston member;

(g) a connection member connected to said body member and adapted to receive a fluid container, said fluid container being in fluid communication with said fluid communication channel; and (h) a guide positioned on said connection member, said guide having a container passage operably aligned with an input to said fluid communication channel, said guide including a platform portion and a guide portion, both of said portions being adapted to form said container passage, said guide portion being formed with extension fingers spaced to form voids adapted to enable an operator to view fluid in said container, said platform portion including a platform surface and a continuous side wall formed beneath said platform surface to form a lip, said lip of said bottle guide resting on said connection member, said continuous side wall having keyways adapted for receiving and engaging internal projections within said connection member.

11. A fluid dispenser, comprising:

(a) a body member having a fluid communication channel and a dose cylinder of a predetermined volume, said fluid communication channel being communicatively connected with said dose cylinder;

(b) a fluid egress conduit communicatively connected to said dose cylinder;

(c) a dose valve positioned and arranged to govern fluid flow from said fluid communication channel to said dose cylinder;

(d) a piston valve positioned and arranged to govern fluid flow out of said fluid egress conduit;

(e) a piston member having a piston head, a distal end and a piston rod connecting said piston head to said distal end, said piston head being sealingly disposed within said dose cylinder;

(f) a trigger member attached to said distal end of said piston member; and (g) a connection member connected to said body member and adapted to receive a fluid container, and comprising means for stabilizing said fluid container on said connection member, said fluid container being in fluid communication with said fluid communication channel, and further including a protective cap sized to fit on said connection member and cover said bottle, wherein said means for stabilizing said fluid container on said connection member is a sleeve insert positioned within said protective cap.

12. A fluid dispenser, comprising:

(a) a body member having a fluid communication channel and a dose cylinder of a predetermined volume, said fluid communication channel being communicatively connected with said dose cylinder;

(b) a fluid egress conduit communicatively connected to said dose cylinder;

(c) a dose valve positioned and arranged to govern fluid flow from said fluid communication channel to said dose cylinder;

(d) a piston valve positioned and arranged to govern fluid flow out of said fluid egress conduit;

(e) a piston member having a piston head, a distal end and a piston rod connecting said piston head to said distal end, said piston head being sealingly disposed within said dose cylinder;

(f) a trigger member attached to said distal end of said piston member; and (g) a connection member connected to said body member and adapted to receive a fluid container, and comprising means for stabilizing said fluid container on said connection member, said fluid container being in fluid communication with said fluid communication channel, and wherein said means for stabilizing said fluid container on said connection member is a guide positioned on said connection member, said guide having a container passage operably aligned with an input to said fluid communication channel.

13. A fluid dispenser, comprising:

(a) a body member having a fluid communication channel and a dose cylinder of a predetermined volume, said fluid communication channel being communicatively connected with said dose cylinder;

(b) a fluid egress conduit communicatively connected to said dose cylinder;

(c) a dose valve positioned and arranged to govern fluid flow from said fluid communication channel to said dose cylinder;

(d) a piston valve positioned and arranged to govern fluid flow out of said fluid egress conduit;

(e) a piston member having a piston head, a distal end and a piston rod connecting said piston head to said distal end, said piston head being sealingly disposed within said dose cylinder;

(f) a trigger member attached to said distal end of said piston member; and (g) a connection member connected to said body member and a sealed chamber mounted on said connection member, said sealed chamber having a first tip, a second tip, and a movable seal positioned within said sealed chamber, said movable seal forming a first reservoir proximate to and in fluid communication with said first tip and a second reservoir proximate to and in fluid communication with said second tip, wherein one of said tips is in fluid communication with said fluid communication channel and the other of said tips is in fluid communication with an external fluid source, wherein said tips have an identical shape and both of said tips are adapted to be selectively connected in fluid communication with said fluid communication channel and with said external fluid source, wherein said sealed chamber is formed by a barrel reservoir and a cap, said barrel reservoir having an open end and a second end forming one of said tips, said cap being adapted for sealingly engaging said open end of said barrel reservoir, said cap further forming the other of said tips, and further comprising a removable guide positioned on said connection member, said removable guide being adapted for stabilizing said sealed chamber on said connection member.

* * * * *